(12) United States Patent
Steenblik et al.

(10) Patent No.: US 8,000,009 B2
(45) Date of Patent: *Aug. 16, 2011

(54) LIGHT CONTROL MATERIAL FOR DISPLAYING COLOR, INFORMATION, AND IMAGES

(75) Inventors: Richard A. Steenblik, Alpharetta, GA (US); Mark J. Hurt, Duluth, GA (US); Michael E. Knotts, Roswell, GA (US)

(73) Assignee: Nanoventions, Inc., Alpharetta, GA (US)

( * ) Notice: Subject to any disclaimer, the term of this patent is extended or adjusted under 35 U.S.C. 154(b) by 5 days.

This patent is subject to a terminal disclaimer.

(21) Appl. No.: 11/751,487

(22) Filed: May 21, 2007

(65) Prior Publication Data

US 2007/0269725 A1 Nov. 22, 2007

Related U.S. Application Data

(63) Continuation of application No. 10/351,286, filed on Jan. 24, 2003, now Pat. No. 7,221,512.

(60) Provisional application No. 60/352,000, filed on Jan. 24, 2002, provisional application No. 60/351,853, filed on Jan. 24, 2002.

(51) Int. Cl.
G02B 5/18 (2006.01)

(52) U.S. Cl. ......................... 359/569; 359/566; 359/580

(58) Field of Classification Search ......................... None
See application file for complete search history.

(56) References Cited

U.S. PATENT DOCUMENTS

| | | | |
|---|---|---|---|
| 4,788,116 A * | 11/1988 | Hochberg | ........................ 430/21 |
| 4,888,260 A | 12/1989 | Cowan | |
| 5,058,992 A | 10/1991 | Takahashi | |
| 5,061,341 A | 10/1991 | Kildal et al. | |
| 5,396,839 A * | 3/1995 | Rice | ................................ 101/32 |
| 5,407,738 A | 4/1995 | Tabata et al. | |
| 5,428,479 A | 6/1995 | Lee | |
| 5,912,767 A | 6/1999 | Lee | |
| 6,051,513 A | 4/2000 | Kumazawa et al. | |
| 6,215,579 B1 * | 4/2001 | Bloom et al. | ................. 359/298 |
| 6,306,529 B1 | 10/2001 | Shimizu et al. | |

(Continued)

FOREIGN PATENT DOCUMENTS

JP 11223713 8/1999

(Continued)

OTHER PUBLICATIONS

Additive color—http://en.wikipedia.org/wiki/Additive_color, retrieved Nov. 21, 2009.*

(Continued)

*Primary Examiner* — Arnel C Lavarias

(74) *Attorney, Agent, or Firm* — Thomas, Kayden, Horstemeyer & Risley, LLP

(57) ABSTRACT

A light control material for displaying a color image. The light control material includes a material body including a plurality of microstructures. The microstructures are designed to produce an additive color perception of one or more colors and designed to reveal an image when the intensity of light reflected from a selected number of the microstructures is modulated. The selected microstructures can be modulated by one or more of modifying, obliterating, obscuring or covering up the selected microstructures. In one embodiment, the microstructures, prior to modulation of the selected number of microstructures, produce a uniform white additive color perception.

41 Claims, 33 Drawing Sheets

U.S. PATENT DOCUMENTS

| | | |
|---|---|---|
| 6,611,643 B2 | 8/2003 | Birk et al. |
| 6,707,518 B1 | 3/2004 | Cowan |
| 7,221,512 B2 | 5/2007 | Steenblik et al. |
| 7,224,528 B2 * | 5/2007 | Phillips et al. ........... 359/584 |
| 2001/0053028 A1 | 12/2001 | Kumazawa et al. |

FOREIGN PATENT DOCUMENTS

| | | |
|---|---|---|
| JP | 2002040218 | 2/2002 |
| WO | WO97/21121 | 6/1997 |
| WO | WO01/04697 | 1/2001 |
| WO | WO02/06858 | 1/2002 |

OTHER PUBLICATIONS

J.J. Cowan, 'Aztec surface-relief volume diffractive structure', J. Opt. Soc. Am. A, vol. 7, No. 8, Aug. 1990, pp. 1529-1544.

P. Hariharan, Optical Holography—Principles, techniques, and applications, Cambridge University Press, Cambridge, 1996, pp. 213-216.

* cited by examiner

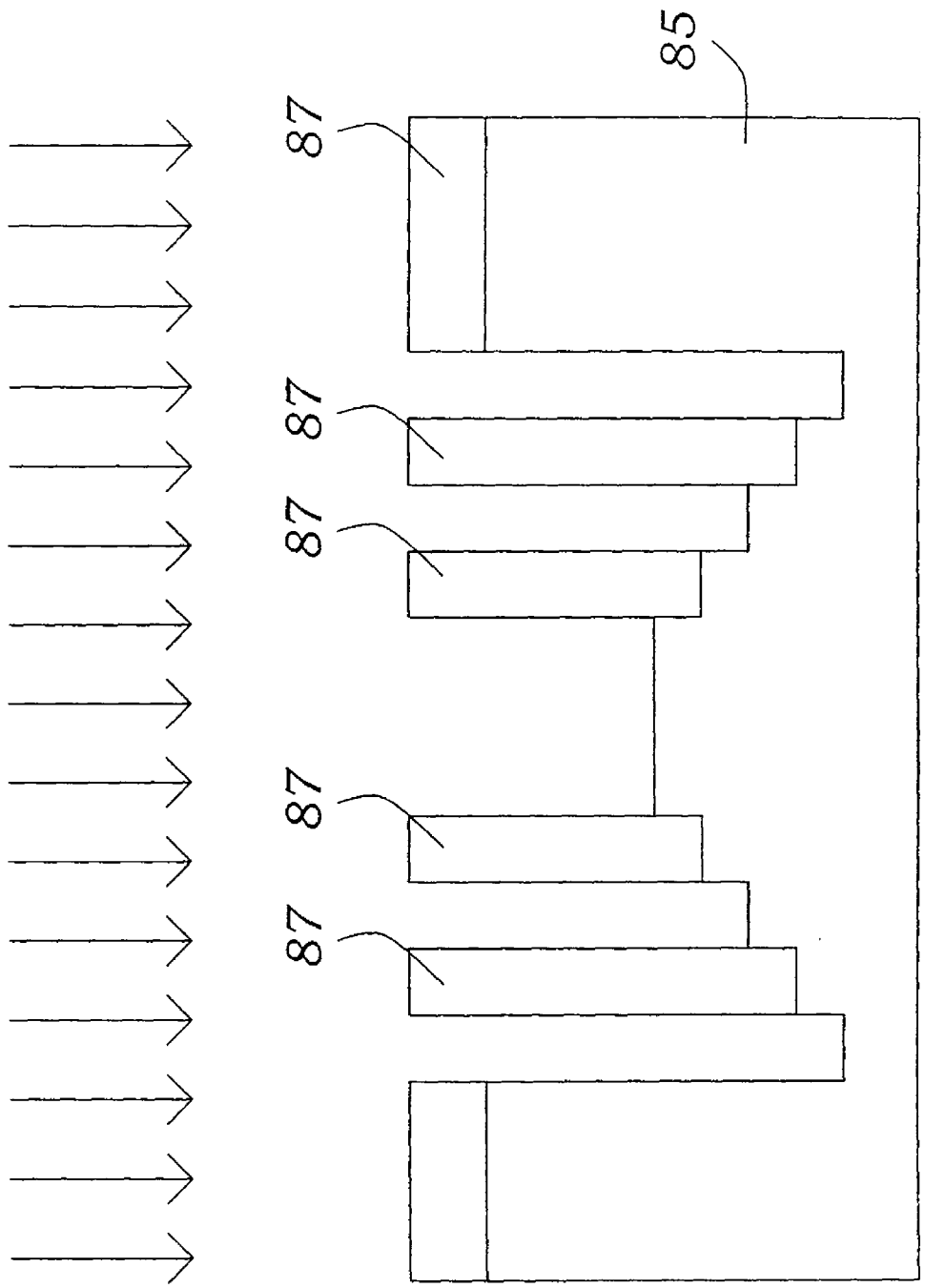

LIGHT CONTROL MATERIAL FOR DISPLAYING COLOR, INFORMATION, AND IMAGES

CROSS REFERENCE TO RELATED APPLICATION

This application is a continuation of U.S. application Ser. No. 10/351,286 filed Jan. 24, 2003, now U.S. Pat. No. 7,221,512, which claims priority to and the benefit of U.S. Provisional Patent Application 60/352,000 filed on Jan. 24, 2002, and U.S. provisional application 60/351,853 also filed on Jan. 24, 2002, both of which are incorporated herein by reference in their entirety.

BACKGROUND OF THE INVENTION

1. Field of the Invention

The present invention relates to compositions and methods of-producing color, information, and images by creating a material having microstructures which reflect a particular central color and bandwidth of light in accordance with their physical characteristics. More particularly, the invention relates to a material comprising periodic microstructures which reflect a particular central color and bandwidth of light in accordance with the periodicity of the microstructures, methods for fabricating the same, and applications of these periodic microstructures.

2. Background of the Art

Stepped microstructures for the reflection of specific bandwidths of visible light are known in nature, in particular in the tropical butterfly Morphos. The wing scales of these butterflies carry minute ridges that have corrugated surfaces consisting of a number of evenly spaced parallel plates separated by uniformly thick air gaps. The ridges consist of the complex carbohydrate chitin, which has a refractive index substantially greater than air. The parallel plates of chitin act like the high refractive index layers of a dielectric interference filter, while the air spaces between them act like the low index layers of a dielectric filter. The color and bandwidth of light reflected by these natural structures depends on a wide range of variables, including the physical dimensions and spacings of the chitin plates, the number of plates, the overall form of the microstructure, the presence or absence of pigment particles in the chitin, the refractive index of the chitin, and the orientation of the microstructures to both the light source and the viewer. The present invention differs from the color structures of the Morphos butterfly in a number of respects: the Morphos structure incorporates undercuts which prevent it from being an embossable shape and the Morphos color structure dimensions are limited to the reflection of blue-green light, while the structures of the subject invention can be designed to reflect light of any chosen color and bandwidth.

U.S. Pat. No. 5,407,738 to Tabata et al. discloses a microstructure which is identical in form and function to that of the Morphos butterfly. The microstructure is extrusion formed at a large scale in a polymer material and a second polymer layer is extruded around it, encasing it. The resulting thick fiber is heated and stretched to reduce its diameter, thereby reducing the size of the encased microstructure. Once the diameter of the microstructure has been reduced to the dimensions needed to provide optical function, the outer encasing layer is removed using a solvent, leaving the microstructured fiber exposed. This method enables the manufacture of an optically nonfunctional large structure and its subsequent reduction in scale to create a smaller optically functional structure. The methods of Tabata et al. are limited to the formation of a large structure and its subsequent reduction of its physical cross-sectional dimensions, and do not enable the formation of a small structure and subsequent expansion of the out-of-plane dimension of that structure to attain a different desired step spacing. Furthermore, the microstructure disclosed by Tabata et al. contains deep undercuts and it cannot be reproduced as an embossed surface. In addition, the microstructure of Tabata et al. requires air spaces between the plates, while the subject invention does not.

Periodic structures of other types have been also been used for the recording and reconstruction of color and color images. In 1895 Lippmann used incoherent interference effects to generate standing wave patterns within a silver-halide gelatin emulsion to create the first photographic recordings of color images. The Lippmann method involved the creation of a standing wave pattern within a silver emulsion by placing a reflective surface, typically mercury, in direct contact with an emulsion coated onto a glass plate. Ambient light from the scene was focused onto the emulsion through the glass plate and standing waves were generated by the interaction of the incoming and the reflected waves. The period of these standing wave patterns depends on the wavelength of the focused light. Monochromatic light produces a standing wave pattern with strong, distinct fringes, while a broader bandwidth produces a pattern which shows sharp, distinct fringe separations close to the reflecting interface and smoother, less distinct fringes further from the reflector. The softening of the fringes is the result of the creation of a continuum of fringe patterns, each having slightly different fringe spacing, from the different wavelengths of illumination. All of the fringes have an antinode at the reflector surface, so small differences in fringe spacing are not evident in that zone. The differences in fringe spacing accumulate the further the waves move from the reflector, reducing the contrast of the fringes. Once developed, this diffusing fringe pattern will selectively reflect the same bandwidth of illumination as was used to form it. Lippmann's standing wave fringe patterns were not rendered as a surface relief structure, in contrast with one of the primary objectives of the subject invention.

Bjelkhagen (Opt. Eng. 38(1) 55-61 (January 1999) *New optical security device based on one-hundred-year-old photographic technique*) discloses an application of the Lippmann process using a panchromatic photopolymer recording medium. In other respects Bjelkhagen's method is essentially the same as Lippmann's. Neither Lippmann nor Bjelkhagen disclosed any methods for altering the central color or the bandwidth reflected from their optical structures, nor any method for altering the spacing between their reflecting layers. The optical structures of Lippmann and Bjelkhagen are internal to the imaging medium; they do not exist as a surface relief structure and neither Lippmann nor Bjelkhagen disclosed any method for creating surface relief replicas from these internal optical structures.

It is known in the art to form stepped structures on the surface of a photosensitive material for the representation of holographic images, wherein the step heights of the structures are one-half the wavelength of the light, as measured within the photosensitive material, used to create the structures. U.S. Pat. No. 4,888,260 to Cowan teaches forming a volume phase reflection (VPR) hologram in a photosensitive material which is comprised of a phase relief stepped or terraced structure formed within another periodic structure. The distance between each step equals half the wavelength, in the photosensitive material, of the light from the beams which entered the medium from opposite directions to form the volume phase reflection hologram. The resulting volume phase reflection hologram is metallized and then overcoated with a high index material and the holographic image is reconstructed by illuminating the terraced phase hologram structure with a beam of light. The holographic image results from the constructive interference of light which is coherently back-scattered from the terraced structure at a wavelength, in air, equal to twice the step height multiplied by the index of refraction of the overcoating layer. The reconstructed back-scattered light has the same color as the recording beam if the overcoating layer has the same index of refraction as that of the original recording medium.

Cowan does not disclose or suggest producing a representation of a two-dimensional color image using stepped structures. Cowan is directed to converting a volume hologram into a surface relief hologram so that the hologram may be replicated by embossing. Moreover, Cowan does not disclose or suggest any method to adjust the dimensions of the stepped structure to accommodate the refractive index of an overcoating layer. Cowan teaches that a VPR hologram advantageously allows viewing at full parallax and in a single color. Col. 2, lines 55-59. Further, Cowan teaches that a full range of colors may be obtained with Cowan's structure by overcoating his structure with a layer of highly reflecting metal and then by overcoating the metal with appropriate clear dielectric layers. Col. 5, lines 28-32.

Neither Cowan nor Bjelkhagen teach or suggest the alteration of the step height to match the index and desired observation wavelength. Tabata et al. refers to multilayer structures that incorporate materials having different indices, not to stepped structures. Tabata discloses one method for reducing the layer spacing of multilayered color selective structures, but does not disclose any method for expanding the layer spacing. Neither of the methods of Tabata nor of Bjelkhagen is compatible with embossing processes. Neither the Tabata nor the Bjelkhagen structures can be formed as surface relief embossments.

Therefore, a need exists in the art for methods for: recording two-dimensional color image information as a microstructure in a master tool and generating embossments from the master which contain the two-dimensional color image information and which display the information in the visible light spectrum; producing pigment-like particles which are either single colored, plurality colored, or optically variably colored particles for inks, paints, polymers, papers, fabrics, and other coatings which are optically and chemically fade-resistant and which create the desired color effect by the interaction of light with a periodic microstructure; 'printing' of additive full-color images by providing a substrate which contains groups of color microstructures that produce a uniform color, or white, when viewed without artificial magnification, and which substrate can be acted on by optical, mechanical, thermal, or chemical means to modify, eliminate, or obscure the light intensity reflected from selected periodic microstructures so as to produce an image, pattern, or information representation from either the modified stepped microstructures or the unmodified stepped microstructures, or both; producing taggant devices based on periodic microstructure particles which selectively reflect chosen wavelengths of light. There also exists a need for light control materials including such microstructures.

SUMMARY OF THE INVENTION

Aspects of the present invention address these needs by recording, color information either in, or on the surface of, a material by creating periodic microstructures which reflect a particular band of light wavelength(s) in accordance with the selected size and periodicity of the microstructures. Suitable material can be either planar, such as a flat sheet of material, or three-dimensional, such as a material having a roughly circular cross-section as, for example, a fibrous polymeric material. The microstructures can be selected to reflect chosen color bandwidths. In another aspect, the microstructures do not depend on dye and pigment chemistry or overcoating to attain color, but selectively reflect specified optical bandwidths by means of constructive interference effects. The colors thus produced are not subject to fading in sunlight nor to chemical bleaching. The microstructures can be used to create additive colors for a large color gamut with high brightness. These color structures can be tuned to produce arbitrary and distinctly different colors from different viewing directions, providing dramatic optically variable effects.

Aspects of the present invention can be used to reproduce a multi-color two dimensional image in a single embossment with no requirement for an overcoating. Additional aspects of the present invention enable the dimensions of the microstructure to be tailored to accommodate the refractive index of any overcoating layer. Still another aspect of the invention provides a light controlling material that is created having stepped structures for selectively controlling and displaying color information. The step height of each stepped structure is nominally equal to ½ of a wavelength of the color of light that is intended to be reflected by the structure to produce an image. When light impinges on the surface of any particular stepped structure, only light which is of the band of wavelength(s) of light that the structure is designed to reflect will be reflected substantially in phase due to the step height of the structure. Wavelengths of light outside of the designed reflection band which impinge on the surface of that particular structure will be reflected substantially out of phase, due to the step height, and will experience destructive interference. Because the visible spectrum of light is less than an octave, any harmonic frequencies which are reflected in phase by the step structures, such as wavelengths of twice the step height or half the step height, will not be within the visible spectrum of light and, therefore, will not be visible to the human eye. The selected light to be reflected may be any color or combination of colors, and may create color information including colored images and/or black and white images.

Exemplary structures of the present invention reflect light in a manner similar to, but not identical with, the way in which an interference filter reflects light. Light impinging on the layers of an interference filter reflect from each interface between materials having a different index. At low-to-high index interfaces the reflected wave also experiences a phase reversal, while at high-to-low index interfaces the reflected wave does not experience a phase reversal. Accounting for this phase reversal requires that the low index layers have a different thickness than the high index layers. The periodic microstructures of the present invention are not encountered in sequence by each part of the impinging light wave, as they are in a multilayer dielectric interference filter, but separately by different regions of the light wave. The periodic microstructures of the present invention are designed to produce the same result as that produced by an interference filter without the need for a multiple layer device.

In the case of the one embodiment above, the stepped microstructures cause light of the desired band of wavelengths which impinge on one step of a particular stepped structure to be reflected in substantially in phase with light of the same band of wavelengths reflected by the other steps of that particular stepped structure. Wavelengths of light which are outside of the reflection bandwidth experience substantially destructive interference and are absorbed at the surface of the device or pass through the interface into the bulk of the material. The stepped microstructures optically function in a manner similar to a conventional Echelon optical grating wherein the step height spacing of the stepped microstructures of the invention is one half wavelength instead of an integer multiple of wavelengths as in a conventional Echelon grating. While Echelon gratings normally take the form of a stepped prism, the stepped microstructures of the invention typically take rotationally symmetric forms, including substantially conical, substantially a conic section, and substantially hemispherical: the stepped microstructures may be either convex, concave, or a combination of these forms wherein one part of the stepped structure is convex and another part is concave.

Stepped microstructures having planar, parallel step surfaces will display a variable color that depends on the angle of incidence of the illumination and the angle of observation of the reflected light. This is a desirable effect to achieve for many applications, including document security devices, variable color ink and paint pigments, and variable color fibers and fabrics. Other applications will benefit from a single, stable color produced by stepped microstructure(s) incorporating non-planar, substantially concentric curved surface steps. The curved surface steps provide a focal point from which the reflected light appears to emanate. This focal point can be seen from many different angles, depending on the details of the specific microstructures, and it enables control of the field of view of the zone of uniform color display. Other variations on the subject invention include combinations of curved steps of different step heights to produce different stable colors in different viewing directions, and combinations of planar steps with curved steps to produce angularly variable tints across a base color.

Once the stepped structures have been fabricated in a surface, embossments can be generated from the surface which display the two-dimensional color image information in the visible light spectrum. The stepped microstructures have a vertical step spacing that is designed to reflect a chosen color when the microstructure is embedded within a material of chosen refractive index. In the context of this description "vertical" refers to the direction which is perpendicular to the plane of the substrate. The vertical step spacing of the stepped microstructures required to reflect a chosen color of light is equal to one half of the wavelength of the chosen color in air (or vacuum) divided by the refractive index of the embedding medium.

Stepped microstructures having different step heights may be combined in a single polymer film to enable the creation of two dimensional full color images using additive color image presentation. For example, multiple columns of microstructures can be disposed on a polymer film in the basic colors red, green and blue in a proportion selected to additively create the appearance of white light. Then, via selective modification or obliteration of the microstructures by a laser, thermal probe, mechanical probe, or deposition of an obscuring coating by an ink jet, dye sublimation, conventional printing plate, electrostatic toner, or other patterned deposition method, a color image may then be reproduced and presented on the polymer film. The use of laser, thermal probe, or mechanical probe to modify the stepped microstructures allows for the construction of a toner-free and ink-free color laser printer. The use of an obscuring coating deposited in a controlled manner allows for the construction of a printing system that deposits a single color of ink or toner (typically black) to obtain a full-color print output.

In another embodiment, the light controlling material of the present invention is created having periodic ribbed structures. In an exemplary form, the periodic ribbed structures are provided around the periphery of a material which is roughly circular in cross-section.

In a further embodiment, the light controlling material of the present invention is created having periodic crystalline structures positioned within the material. In an exemplary form, the crystalline structures have a different refractive index than that of the material in which they are formed. Both the ribbed structures and the crystals-like structures can be combined with the stepped structures for additional efficiency or for bandwidth broadening effects.

In yet another embodiment, a light controlling material is created in which certain of the light-controlling periodic microstructures can be selected to create desired light information and effects providing a printing substrate and process which does not require conventional pigments or dyes for printing the desired information.

These advantages of the present invention will become more apparent from the following specification and claims.

BRIEF DESCRIPTION OF THE DRAWINGS

A more complete understanding of the present invention sufficient to enable one skilled in this art to make and practice the invention may be gained by considering the following detailed description in conjunction with the accompanying drawings in which identical reference numerals are used to designate the same elements in each figure, where.

DETAILED DESCRIPTION OF THE INVENTION

One embodiment of the present invention provides a material having periodic microstructures formed in or on the material fabricated for producing a color image from_reflected light. In an exemplary embodiment, the periodic microstructures can comprise stepped structures of differing step heights so that a multi-color image is produced by light reflected from the surface, ribbed structures of selected periodicity, or crystal-like structures as further described below.

Other embodiments of the invention provide methods for fabricating a light control material, or device, which carries color information in the form of periodic structures wherein each periodic structure reflects only one color of light in accordance with the design of that particular periodic structure. The fabricated device can serve as a master from which embossments can be generated which bear the color information carried on the master.

As used herein, the term "hologram" means a three-dimensional image reproduced from a pattern of interference produced by a split coherent beam of radiation.

As used herein, the term "microstructure" means a stepped, reflective structure designed to reflect a desired bandwidth or wavelength of electromagnetic radiation by means of constructive interference effects. The steps of the microstructure can be in relief or recess.

As used herein, the term "crystalline" means having at least one characteristic of a crystal, for example quartz. Exemplary crystalline characteristics include but are not limited to transparency or partial transparency and colorlessness.

As used herein, the term "visible light" or "visible spectrum light" means wavelengths of light in the range of about 400 to about 700 nm.

As used herein, the term "bandwidth" means a range of wavelengths or frequencies of an absorption, emission or transmitted band.

Figure 1:
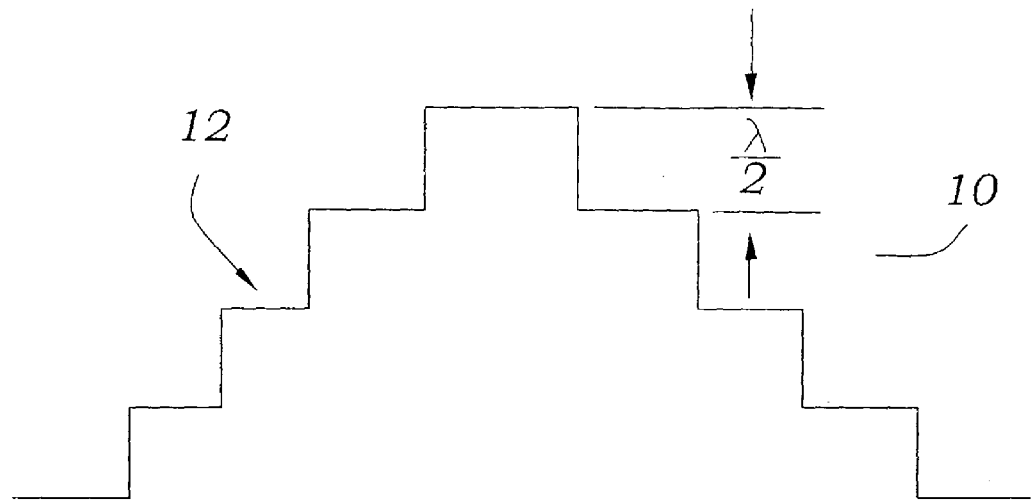
FIG. 1 illustrates a front elevational, cross-sectional view of a surface having an exemplary stepped structure formed thereon in accordance with the present invention.

FIG. 1 illustrates a front elevational view of a surface 15 with one of the stepped structures 10 of a first embodiment of the present invention formed thereon. The step height of the steps 12 of the structure is designed to be equal to approximately ½ of a wavelength of the color of light that is intended to be reflected by the structure. When light impinges on the surface of the structure only light which is of the wavelength of light that the structure is designed to reflect will be reflected in phase due to the step height of the structure. All other wavelengths of light impinging on the surface will be reflected out of phase to a greater or lesser degree due to the step height of the structure and will experience destructive interference. Since the visible spectrum of light is less than an octave, any harmonic frequencies which are reflected in phase by the structure will not be within the visible spectrum of light.

For ease of reproduction, a dielectric material is preferred for the stepped structures. The dielectric constant for the material is not important. Any dielectric constant in the normal range will do, but higher dielectric constants are preferable. The stepped structures, however, are not particularly sensitive to the dielectric constant.

Figure 2:
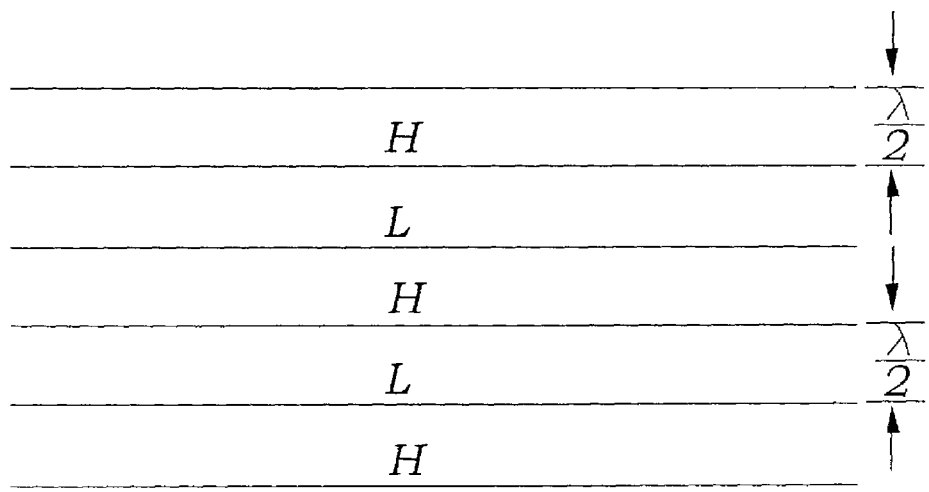
FIG. 2 illustrates a schematic diagram of a typical interference filter.

An exemplary device of the present invention reflects light in a manner analogous to the way in which an interference filter reflects light. As illustrated in FIG. 2, a typical interference filter is comprised of alternating layers of high and low refractive index materials, a quarter wave thick and a half wave thick, respectively. The thickness of each layer is designed to reflect incident light of the design wavelength in phase with the light reflected from each of the other layer interfaces. Light impinging on the interference filter is reflected at each interface of the low and high refractive index layers. In an analogous manner, light having the desired wavelength will be reflected at each step 12 on the structure 10 of the present invention in phase with light of the same wavelength reflected by the other steps 12. All other wavelengths of light will experience some degree of destructive interference and will be absorbed at the surface of the device. Since the visible spectrum of light is less than an octave, any harmonic frequencies which are reflected in phase from the structures will not be within the visible spectrum of light. Once the stepped structures have been formed in a surface, the surface can be used as a master and embossments can be generated therefrom or, alternatively, the surface can be used to create a master from which embossments can be generated.

Figure 3A:
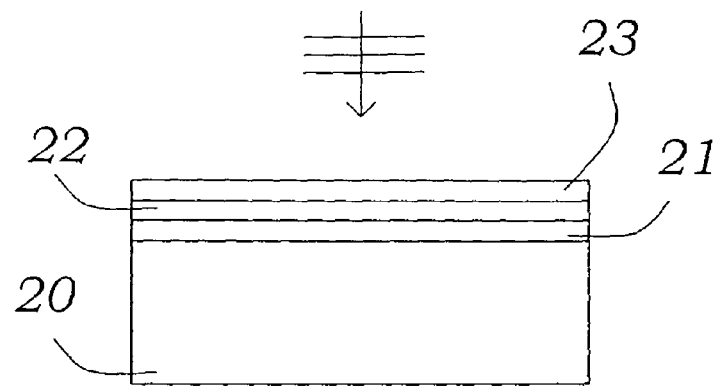
FIGS. 3a-3c illustrate alternative embodiments for generating standing wave patterns in an emulsion layer.

FIG. 3a illustrates a cross-sectional view of light control material fabricated in accordance with a first embodiment of the present invention. A substrate 20, preferably glass, is coated with a thin layer of some reflective material 21, preferably a reflective metal such as aluminum or chrome. The reflective layer 21 is preferably deposited by using a vapor deposition technique, although any conventional technique for coating a substrate with a reflective layer can be used. Alternatively, the reflective layer 21 may be provided by polishing or other surface smoothing of substrate 20. Reflective layer 21 is then coated with a photosensitive layer 22 which is preferably deposited by using a spin-coating technique. Photosensitive layer 22 is preferably a high resolution fine grade photographic emulsion. Alternatively, a holographic emulsion, photoresist, or a photopolymer can be used. A positive photographic or other image transparency layer 23 is then placed in contact with photosensitive layer 22. This assembly is then exposed to a collimated beam of light of the wavelength that the structures being fabricated in the device are intended to reflect. This exposure creates standing wave patterns in the photosensitive layer in areas of the photosensitive layer which are exposed to light of the intended wavelength in the photographic transparency 23. These standing wave patterns make it possible to form the stepped structures, as described below in the exemplary method illustrated in FIGS. 4a through 4f.

Alternatively, instead of projecting collimated light through a photographic or other image transparency 23 in direct contact with photosensitive layer 22, an image may be projected onto photosensitive layer 22 by an optical system wherein a projection or collimation lens or reflector assembly illuminates the photosensitive layer 22 with the desired image. The presentation of color image information may be provided in either case by illumination of a grayscale image, similar to a color separation film, with light of a suitable chosen color. In this case separate grayscale images, and separate exposures, are used for each color to be represented.

Generally, standing wave patterns are generated in the photosensitive layer 22 when light waves of a particular wavelength which pass through the photosensitive layer 22 and are incident upon the reflective layer 21 are reinforced by light waves of the same wavelength which are reflected back up through the photosensitive layer 22 by the reflective layer. Wherever the light waves reinforce, or constructively interfere, in the photosensitive layer 22, a photochemical reaction in the emulsion causes a standing wave pattern to be formed in the photosensitive layer 22. Where the light waves destructively interfere they do not cause a photochemical reaction in the photosensitive layer 22. The regions which experience a photochemical reaction to the constructively reinforce standing wave pattern form surfaces which are substantially planar and substantially parallel to the surface of the reflective layer 21.

Figure 3B:
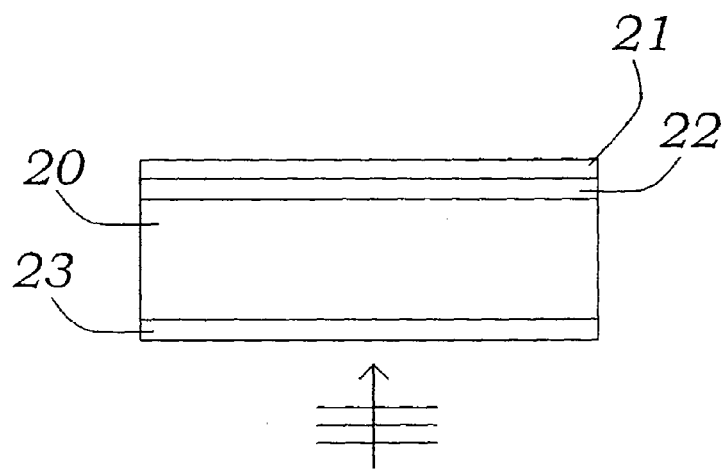
Figure 3C:
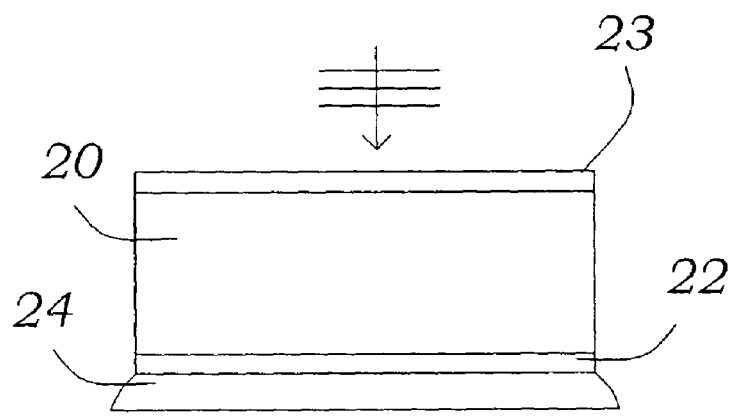

FIGS. 3b and 3c illustrate alternative methods of the invention for generating the standing wave patterns in the photosensitive layer 22. As indicated in FIG. 3b, the positions of the reflective layer 21 and the photosensitive layer 22 are reversed. The photographic transparency 23 is placed on the bottom of substrate 20. Collimated light of a selected wavelength is projected onto photographic transparency 23. Only the areas in the photographic transparency which correspond to the wavelength of light being projected thereon will allow the light of the particular wavelength to pass through substrate 20 and photosensitive layer 22. Standing wave patterns will be generated in photosensitive layer 22 in areas where light waves passing through photosensitive layer 22 which are incident upon reflective layer 21 are reinforced by light waves being reflected by reflective layer 21 back down through photosensitive layer 22.

In FIG. 3c, the photographic transparency 23 is placed on top of substrate 20. photosensitive layer 22 is located underneath substrate 20 and in contact therewith. photosensitive layer 22 is in contact with a reservoir of a reflective material 24, such as mercury, which provides the desired reflectivity. Collimated light is projected through the photographic transparency. Standing wave patterns are generated in photosensitive layer 22 where light waves passing through the photosensitive layer which are incident upon the mercury 24 are reinforced by light waves being reflected by the mercury 24.

Figure 4A:
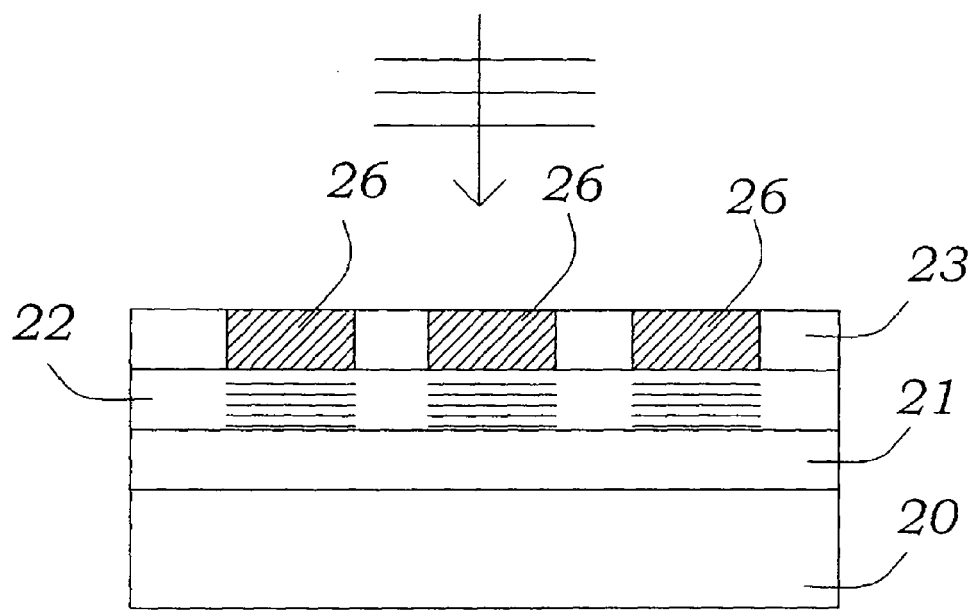
FIGS. 4a-4f illustrate an exemplary embodiment for fabricating the light control material of the present invention.
Figure 4B:
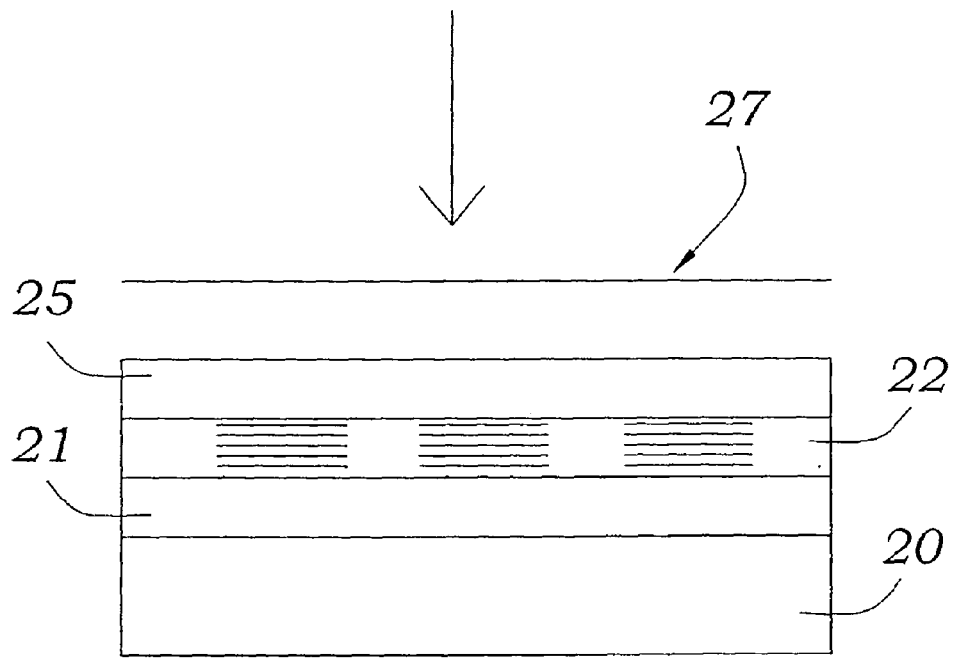
Figure 4C:
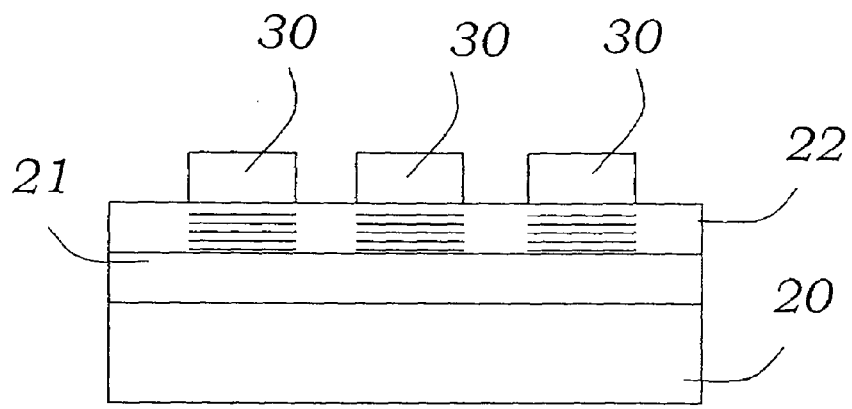

FIG. 4a illustrates an enlarged cross-sectional view of the device of FIG. 3a. The fabrication method discussed above with reference to FIG. 3a will now be described in detail with reference to FIGS. 4a-4f. Substrate 20 is coated with a reflective layer 21 or is otherwise provided with a reflective surface, as by polishing. The reflective layer is preferably comprised of a reflective metal, such as chrome or aluminum. Reflective layer 21 is then coated with a layer of photosensitive material 22, such as a photographic emulsion. A positive photographic transparency 23 (or other image) is then placed on top of photographic emulsion layer 22. Photographic transparency 23 may contain a plurality of colors, for example, red, green and blue. Areas in the photographic transparency which are of the same color as the wavelength of light being projected thereon will pass that wavelength of light. Areas of the photographic transparency 23 which are not the same color as the wavelength of light being projected onto the photographic transparency 23 will be opaque to the wavelength of light being projected onto the transparency, i.e., they will not pass that wavelength of light. If the photographic transparency contains areas of red, green and blue, for example, the device will be exposed in sequence to a collimated beam of each of those colors of light. As the device is exposed to each of those wavelengths of light, standing wave patterns are generated in emulsion layer 22 below the corresponding colors in the photographic transparency 23. The areas 26 in the photographic transparency 23 correspond to different colors in the transparency.

The emulsion layer 22 is generally comprised of a gelatin which contains crystals of silver halide. When standing waves are generated in the emulsion layer 22, the silver halide crystals chemically react with the gelatin. The photographic transparency 23 is then removed and the emulsion is subjected to a developing step (not shown) which produces the hardened standing wave patterns in the emulsion layer 22. An alternative photosensitizing agent, used in place of silver halide, is potassium dichromate. Both silver halide emulsions and dichromate gelatin emulsions (potassium dichromate in gelatin) have well known and widely published development chemistries and procedures.

Once the emulsion has been developed to produce the hardened standing wave patterns therein, the emulsion layer 22 is covered with a layer of photoresist 25. The photoresist layer 25 is then exposed to ultraviolet light through a mask 27. The mask 27 contains a pattern of clear and opaque areas. The clear areas in the mask 27 may be patterned, for example, as be substantially randomly sized (bounded within a selected range) and substantially randomly positioned circular holes (not shown). After the photoresist has been exposed to the ultraviolet light through mask 27, the unexposed areas of the photoresist are developed away leaving substantially randomly sized and substantially randomly positioned circular formations 30 of photoresist over the standing wave patterns formed in emulsion layer 22. The emulsion is then etched with a chemical, such as an acid. The photoresist formations 30 function as a mask during the wet etching step. As the chemical etches down into the emulsion layer 22, it etches the layers in the emulsion which were not exposed to the standing wave pattern more aggressively than it etches the layers that were exposed to the standing wave pattern. The result of the wet etching step is the stepped structure 31 shown in FIG. 4d. The height of the steps of each structure 31 will depend on the wavelength of light that generated the corresponding standing wave patterns in the emulsion layer 22.

Because the wavelength sensitivity of many photoresist and photopolymer materials tends to be highest for UV illumination and zero below a wavelength threshold in the blue-green or green portion of the spectrum, it may be necessary to 'map' the desired visible light reflection bandwidth into an equivalent bandwidth of higher energy, in the blue or UV region to form a correctly proportioned high contrast to low contrast fringe pattern. The actual microstructures 31 may then be expanded by chemical means, physical means, or by differential deposition or etch rate transfer into another substrate. For example, once the stepped structures 31 have been formed in the emulsion layer 22, the emulsion may be exposed to a chemical which swells, or expands, the structures 31 uniformly (not shown). Preferably, triethanolamine, or TEA, will be used for this purpose. By swelling the microstructures 31 it is possible to produce microstructures 31 which can present any optical wavelength, from far infrared to deep ultraviolet, without the need for polymeric overcoats. Furthermore, the step height of the microstructures can be selectively tailored to present any desired color when it is overcoated with a material of any chosen refractive index.

Figure 4D:
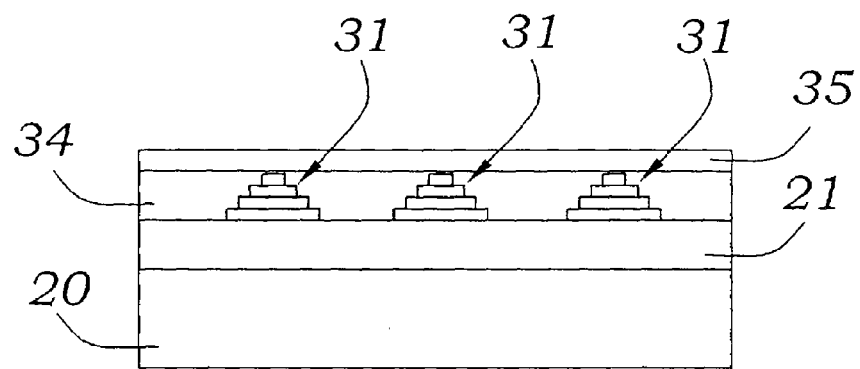
Figure 4E:
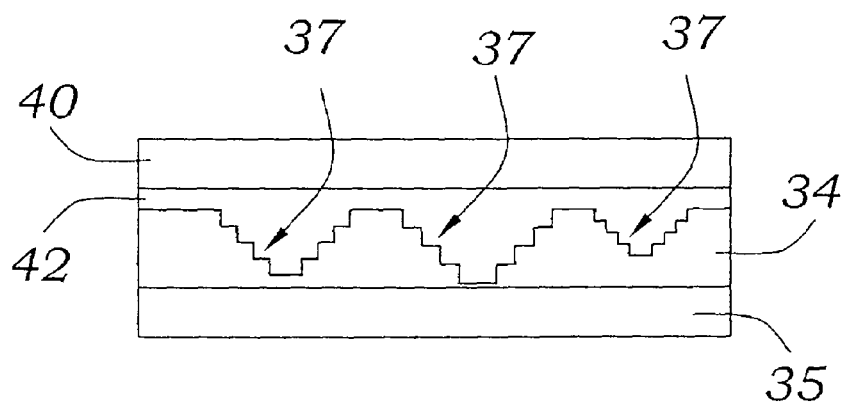
Figure 4F:
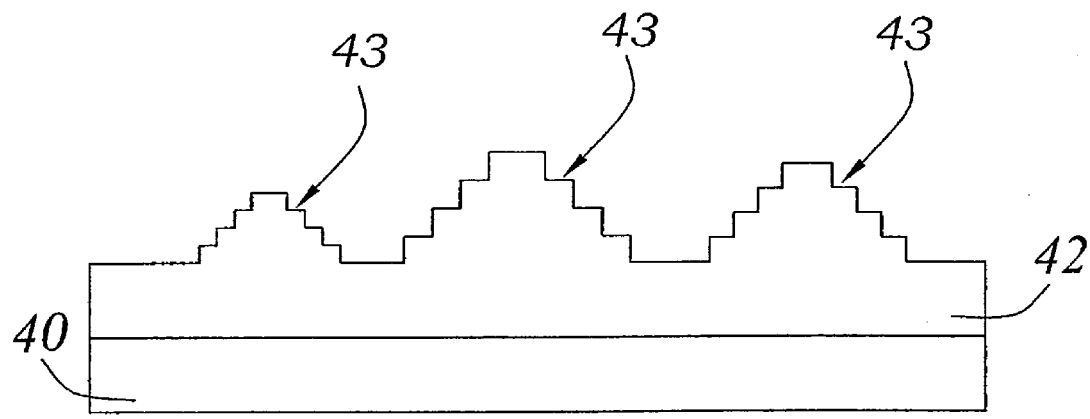

Once the structures have been expanded to the desired size, a layer of liquid photopolymer 34 is placed in contact with the structures 31 and with reflective layer 21, as shown in FIG. 4d. A substrate 35, preferably a glass substrate, is placed in contact with the liquid photopolymer 34. The device is then exposed to ultraviolet light which hardens the liquid photopolymer 34 and causes it to adhere to the substrate 35. The hardened photopolymer 34 and the substrate 35 represent a negative of the stepped structure 31. The negative constitutes a master from which subsequent embossments can be generated. The master, consisting of substrate 35 and hardened photopolymer 34, can be electroplated with a metal, such as nickel, to create a metallic master. Therefore, once the stepped structures 31 have been created in the emulsion, a master can be produced therefrom having a negative relief 37 of the stepped structures 31. Embossments, such as the one shown in FIG. 4f, can be readily produced from the master which contains all of the color image information of the photographic transparency 23 of FIG. 4a. FIG. 4e illustrates one of many well known methods that can be used to make an embossed polymer copy from the master in which the master is filled with liquefied polymer 42 and transfer surface or substrate 40 is applied to the polymer 42 prior to hardening of the polymer 42. The polymer 42 is then hardened and the embossment illustrated in FIG. 4f removed from the master showing the final stepped structures 43 having varying heights.

The number of steps formed in the emulsion is dependent on the thickness of the emulsion and the wavelength of the light used to generate the standing wave patterns. The number of steps of the stepped structures formed in the emulsion layer can be increased or decreased as desired. A larger number of steps of any particular stepped structure_results in a narrower bandwidth of light reflected by that structure and a smaller number of steps results in a wider bandwidth of reflected light. This effect results because the reflected bandwidth corresponds to those wavelengths of light that "fit" the spacing of the steps to a greater or lesser degree. More wavelengths can be approximately matched to the spacing of a small number of steps than can be fit to a large number of steps. For a very large number of steps, say fifty steps, only a small bandwidth of wavelengths will match the step spacing and remain substantially in phase. Those wavelengths which do not match the step spacing well will be reflected out of phase, and will experience destructive interference.

FIGS. 5a-5f illustrate an alternative embodiment for creating the light control material of the present invention. A transparent substrate 45, such as quartz, is coated with a layer of photoresist 46. The photoresist layer can be applied by spin coating or by any other conventional technique. Photoresist layer 46 is then covered with a layer comprised of a reflective material, preferably a metal such as aluminum. Preferably, the reflective layer 47, if comprised of metal, is vapor deposited onto the photoresist layer 46. A color separation 48, typically being a black and white film grayscale mask, is placed in contact with the substrate 45. The color separation acts as a mask which prevents certain areas of the photoresist layer 46 from being exposed to the light projected onto the mask. For example, if a red color separation is used, only the areas in the photographic layer 46 which correspond to red areas in the image from which the color separations are generated will be exposed to ultraviolet light. If the photoresist does not respond to light in the visible spectrum, ultraviolet wavelengths can be used which have the same wavelength ratio to each other as red, blue and green light have in the visible spectrum.

Figure 5A:
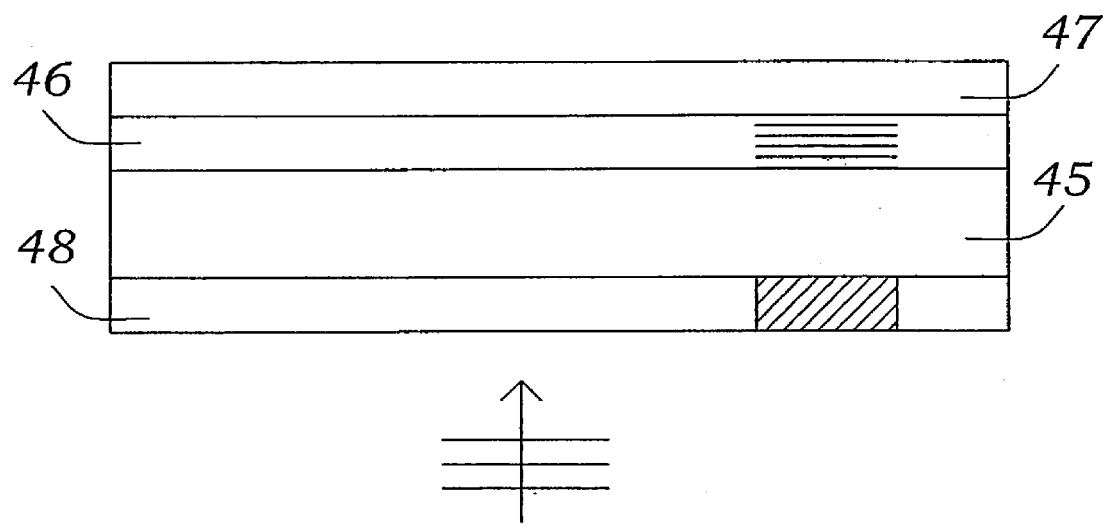
FIGS. 5a-5f illustrate another exemplary-embodiment for creating the light control material of the present invention.
Figure 5B:
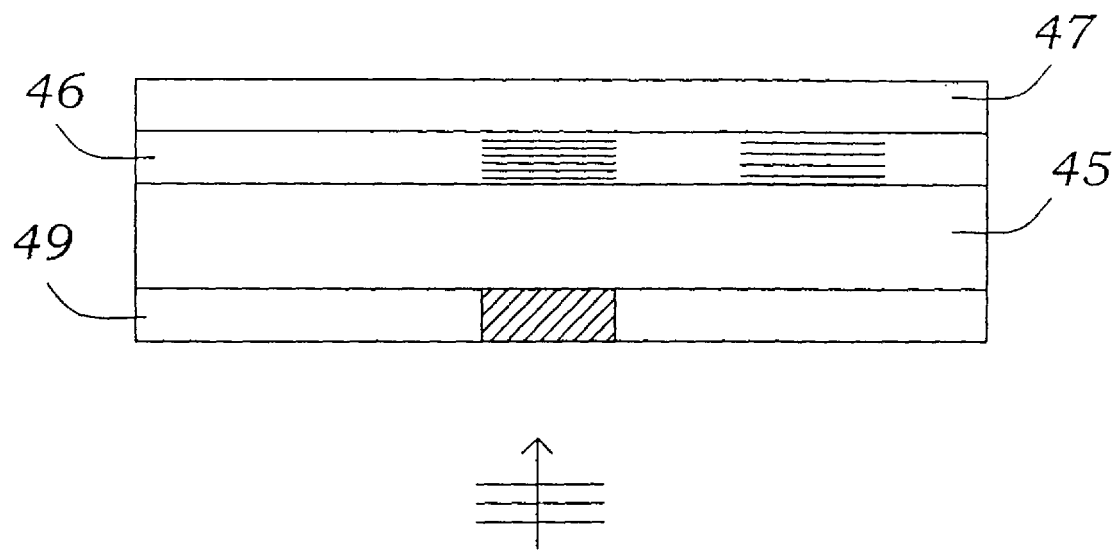
Figure 5C:
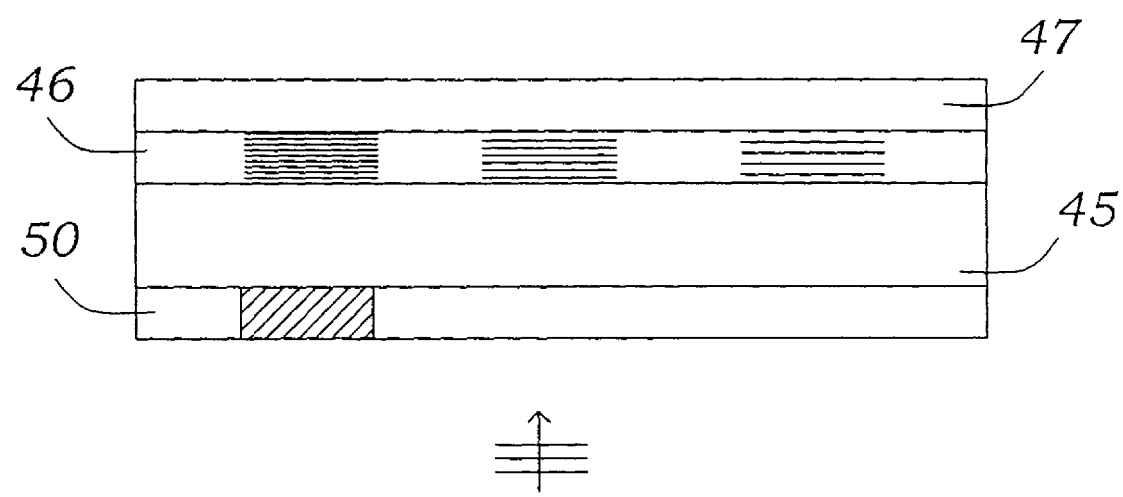
Figure 5D:
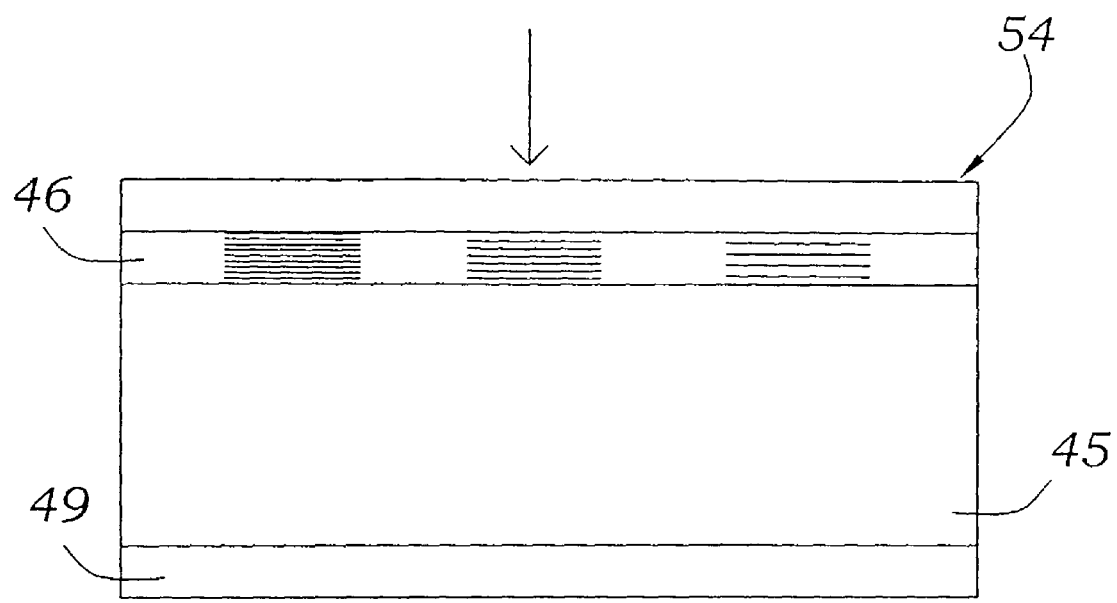
Figure 5E:
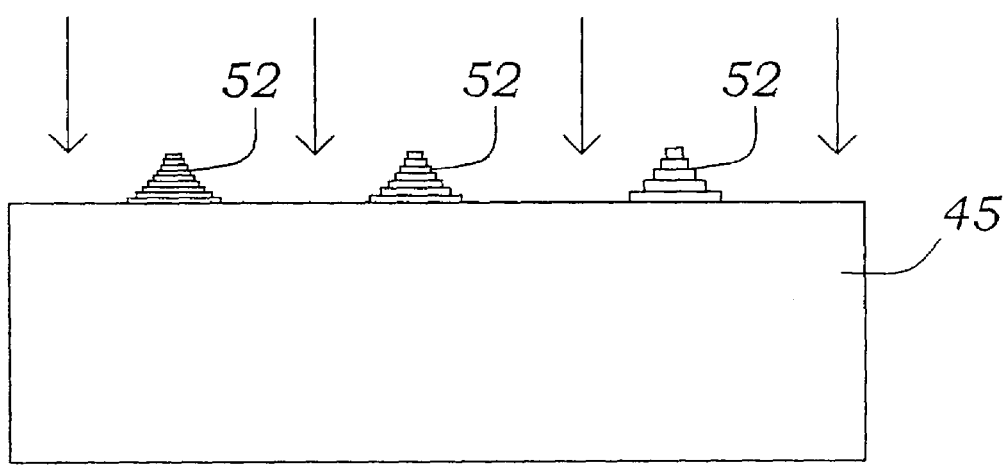

FIG. 5a illustrates standing wave patterns being generated in a layer of photoresist 46 when a first wavelength of ultraviolet light is projected onto a first color separation 48. The standing wave patterns generated in the photoresist layer 46 will be characteristic of the wavelength of ultraviolet light projected onto the color separation 48. FIG. 5b illustrates a second wavelength of ultraviolet light being projected onto a second color separation 49 to generate standing wave patterns in the photoresist layer 46. FIG. 5c illustrates a third wavelength of ultraviolet light being projected onto a third color separation 50 to generate standing wave patterns in the photoresist layer 46. Once standing wave patterns have been generated at certain locations in the photoresist layer 46 which correspond to the locations of the different colors in the image from which the color separations were generated, the reflective layer 47 is stripped away. In FIG. 5d, a mask 54, which is identical to the mask 27 described above with reference to FIG. 4b, is placed above the photoresist layer 46. A light absorbing material 49, such as black velvet, is placed underneath substrate 45. The light absorbing material 49 prevents additional standing wave patterns from being generated in the photoresist layer 46 when it is exposed to ultraviolet light through mask 54. After exposure to ultraviolet light, the photoresist layer 46 is developed. During the development step, the stepped structures are created due to the prior exposure of the photoresist layer 46 to the different wavelengths of ultraviolet light which were used to generate the standing wave patterns. FIG. 5e illustrates the stepped structures which have different step heights which correspond to the three different ultraviolet wavelengths used to create the standing wave patterns in the photoresist layer 46. Since the stepped structures were created using three different wavelengths of ultraviolet light rather than longer wavelength red, green and blue light, the stepped structures must be enlarged in the vertical direction (as drawn) in order to reflect the proper wavelengths of light.

Figure 5F:
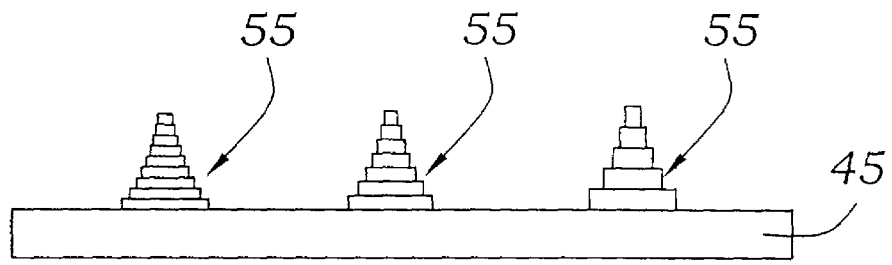

The stepped photoresist structures 52 are used as masks during a reactive ion etching step which causes the shape of the stepped structures to be mapped down into the substrate 45, which is preferably silicon or silicon dioxide. By controlling the conditions of reactive ion etching, the shape of the stepped structures can be mapped down into the substrate 45 in such a manner that the step height of the stepped structures in the substrate 45 is predetermined, i.e., the desired step heights in the substrate can be achieved by controlling the conditions of reactive ion etching. Typically, fluorine chemistry, preferably a chlorofluorocarbon such as Freon, is used during reactive ion etching. Freon reacts vigorously with quartz and very slowly with the photoresist thereby producing a very high etching differential and causing the vertical spacing of the steps to be enlarged. FIG. 5f illustrates the device after the stepped structures have been etched down into the quartz substrate 45. As illustrated in FIG. 5f, the quartz substrate has been etched away to a large degree to form the quartz stepped structures 55 therein. The etched quartz substrate can be used as a master for making embossing tooling by preferably electroforming it with nickel as previously described. Subsequent embossments which contain all of the color information of the original image from which the color separations were generated can be produced from the master in the same manner as described above with reference to FIG. 4e.

Figures 6A, 6B:
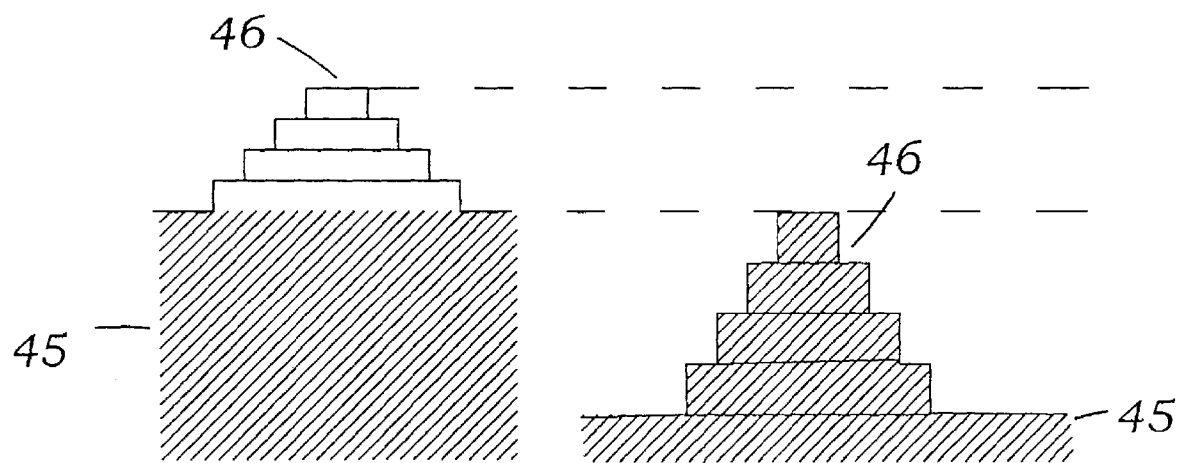
FIGS. 6a and 6b illustrate a representative method for expanding the vertical dimension of a microstructure in accordance with another embodiment of the present invention.

As illustrated in FIGS. 6a and 6b, the height of the stepped microstructures of the present invention may be adjusted by controlling the conditions of the photoresist and etching step. A stepped photoresist microstructure 46 can be created as discussed above on the surface of a silicon substrate 45. The microstructure 46 and silicon substrate 45 are then exposed to reactive ion etching which erodes the substrate 45 at a substantially higher rate than the photoresist 46. As areas of substrate 45 become unmasked by the etching away of the overlaying photoresist 46, their etch rate increases. Thus, a stepped structure having either a larger vertical dimension or a smaller vertical dimension than that of the initial photoresist stepped structure can be etched into the silicon substrate 45. The height of the stepped structures may be adjusted as desired by altering the photoresist composition, the thickness of the photoresist, or the reactive ion etching conditions.

Figure 7A:
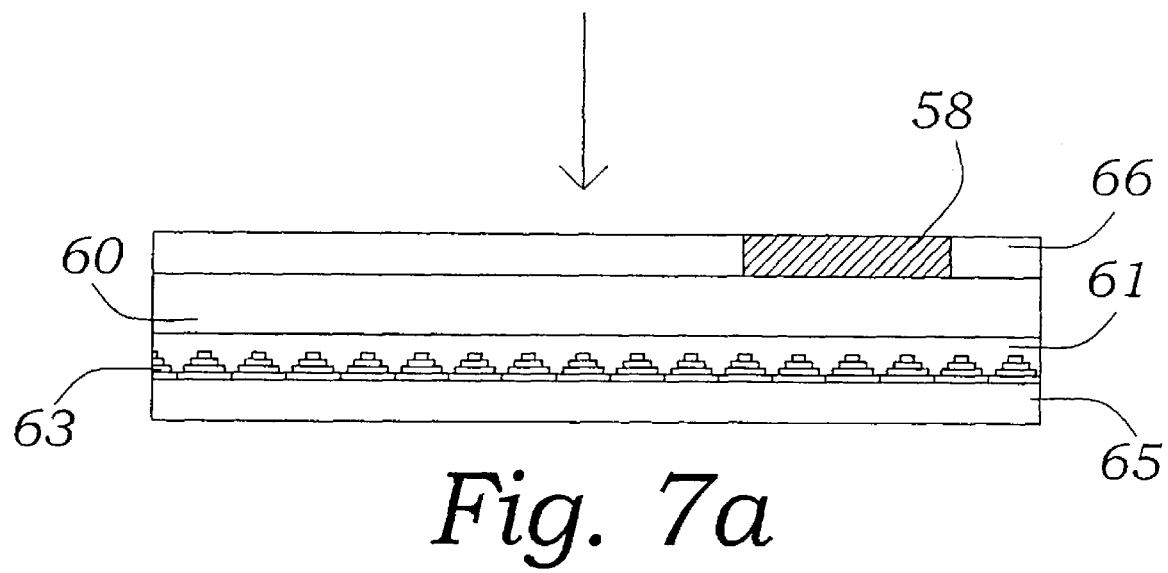
FIGS. 7a-7d illustrate a further alternative embodiment for creating the light control material of the present invention.
Figure 7B:
Figure 7C:
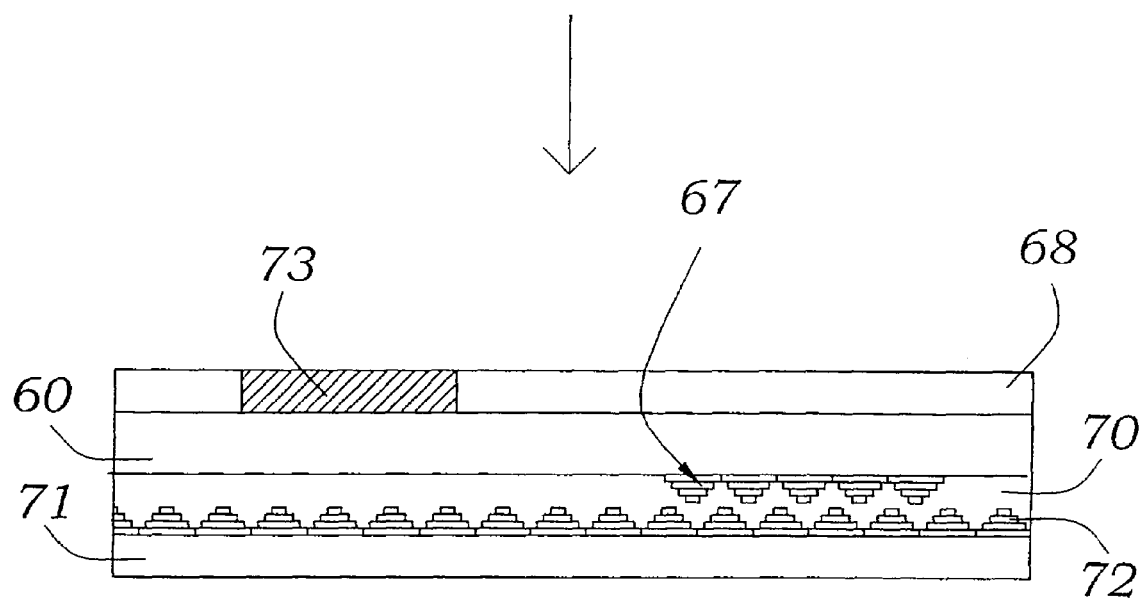
Figure 7D:
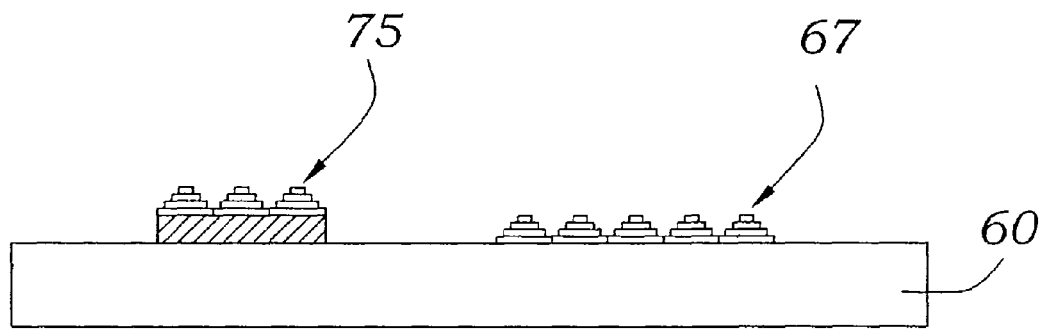

FIGS. 7a-7d illustrate another alternative embodiment for producing the light control material of the present invention. First, a red master, a green master, and a blue master are fabricated in accordance with any of the foregoing embodiments. FIG. 7a illustrates, for example, a red master comprised of substrate 65 having stepped structures 63 thereon which reflect only red light. A liquid photopolymer 61 is placed in contact with the master as shown. A glass substrate 60 is placed in contact with the liquid photopolymer 61. A red color separation 66 which corresponds to the red colors in the image being reproduced is placed on the glass substrate 60. The entire structure is then subjected to ultraviolet light through the color separation 66. Only the areas in the liquid photopolymer beneath the areas 58 in the color separation 66 which correspond to red in the original image become exposed to the ultraviolet light. FIG. 7b illustrates the embossment generated from the master. The embossment is comprised of substrate 60 and stepped structures 67 which correspond to the hardened photopolymer 61. As illustrated in FIG. 7c, this embossment having the stepped structures 67 thereon is placed in contact with a layer of liquid photopolymer 70 which is also in contact with a green master comprised of substrate 71 and stepped structures 72 which reflect only green light. A green color separation 68 is placed on top of substrate 60. The entire structure is then exposed to ultraviolet light through color separation 68. Only the areas in the liquid photopolymer which are below the areas 73 in the color separation 68 which correspond to green in the original image will be exposed to ultraviolet light. FIG. 7d illustrates the resulting embossment which is comprised of substrate 60 having stepped structures 67 and stepped structures 75 formed thereon which reflect red light and green light respectively. The embossment of FIG. 7d is then placed in contact with a blue master in the same manner as described above with reference to FIGS. 7a-7c such that the final embossment is a substrate having stepped structures which reflect red, green and blue light and which are located in positions which correspond to the locations of these colors in the original image. A master is then generated from the embossment in the same manner as described above with reference to FIGS. 4d and 4e. The resulting master can then be electroplated with a metal, such a nickel, to create a metallic master. Subsequent embossments of the original image can be readily reproduced using the final master.

Figure 8A:
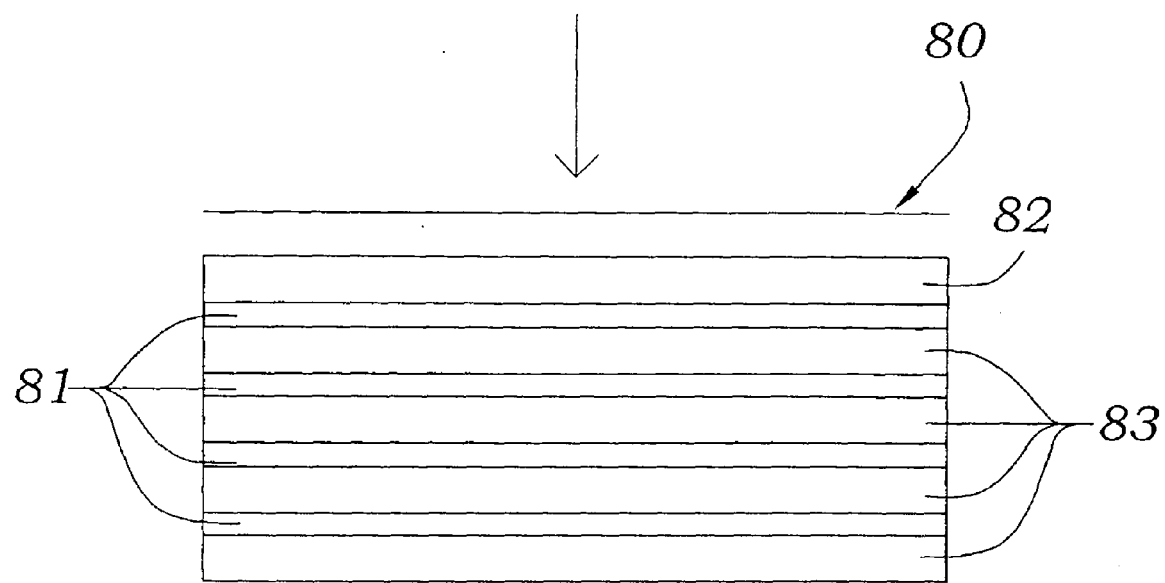
FIGS. 8a and 8b illustrate another alternative embodiment for creating the light control material of the present invention.
Figure 8B:
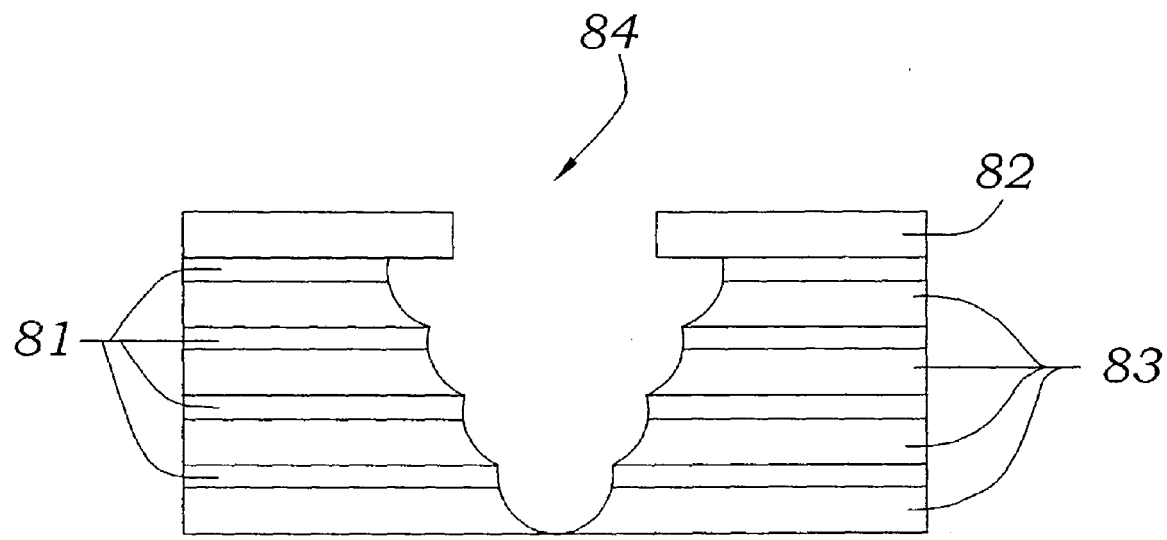

FIGS. 8a and 8b illustrate cross-sectional views of an alternative embodiment of the present invention. Multiple layers of two different materials 81 and 83 are deposited in an alternating sequence by vapor deposition or other suitable method. A layer of photoresist 82 is deposited onto the top material layer 81. Materials 81 and 83 are chosen in accordance with their etch rates, wherein material layer 81 has a higher etch rate than material layer 83. A mask 80 having clear and opaque areas therein masks photoresist layer 82 during exposure to ultraviolet light. The areas 84 of the photoresist which are exposed to the ultraviolet light are subsequently developed away and the top material layer 81 becomes uncovered. A wet or dry etching technique is then used to etch steps down into the material layers 81 and 83, as illustrated in FIG. 8b. Since material layer 81 has high etch rate and material layer 83 has a low etch rate, a stepped structure is created, as illustrated in FIG. 8b. Photoresist layer 82 is then removed (not shown) and the remaining structure is a master from which embossments can be generated. The combined thickness of material layers 81 and 83 must total one half of the wavelength of the light that the structure is designed to reflect.

Material layers 81 are preferably aluminum and material layers 83 are preferably chrome which has a much lower etch rate than aluminum. However, there are many other materials which have the desired etching characteristics and other necessary physical characteristics. Mask 80 preferably consists of a substantially randomly sized and substantially randomly positioned hole pattern, as discussed above with regard to FIGS. 4b and 4c. If a wet etching technique is used, an acid which etches material layer 81 faster than material layer 83 can be employed. Reactive ion etching, ion beam milling, or any other suitable dry etching technique can be used provided the conditions of the dry etching process result in material layer 81 being etched at a higher rate than material layer 83. The ratio of the thicknesses of layer 81 to layer 83 may preferably be selected to be proportionate to their relative etching rates.

Figure 9A:
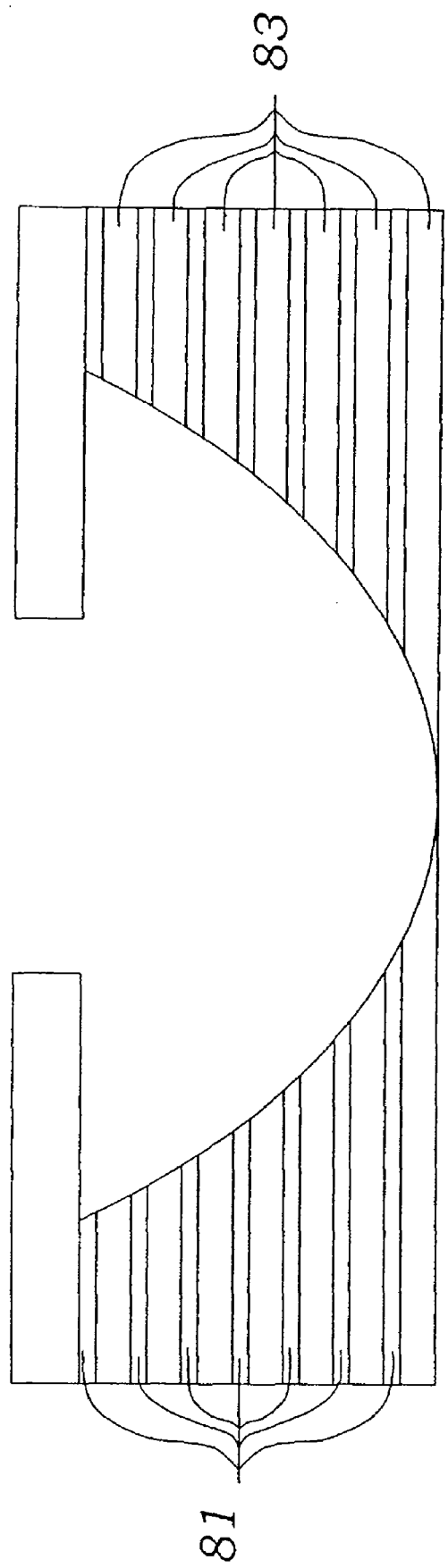
FIGS. 9a and 9b illustrate another alternative embodiment for creating the light control material of the present invention.
Figure 9B:
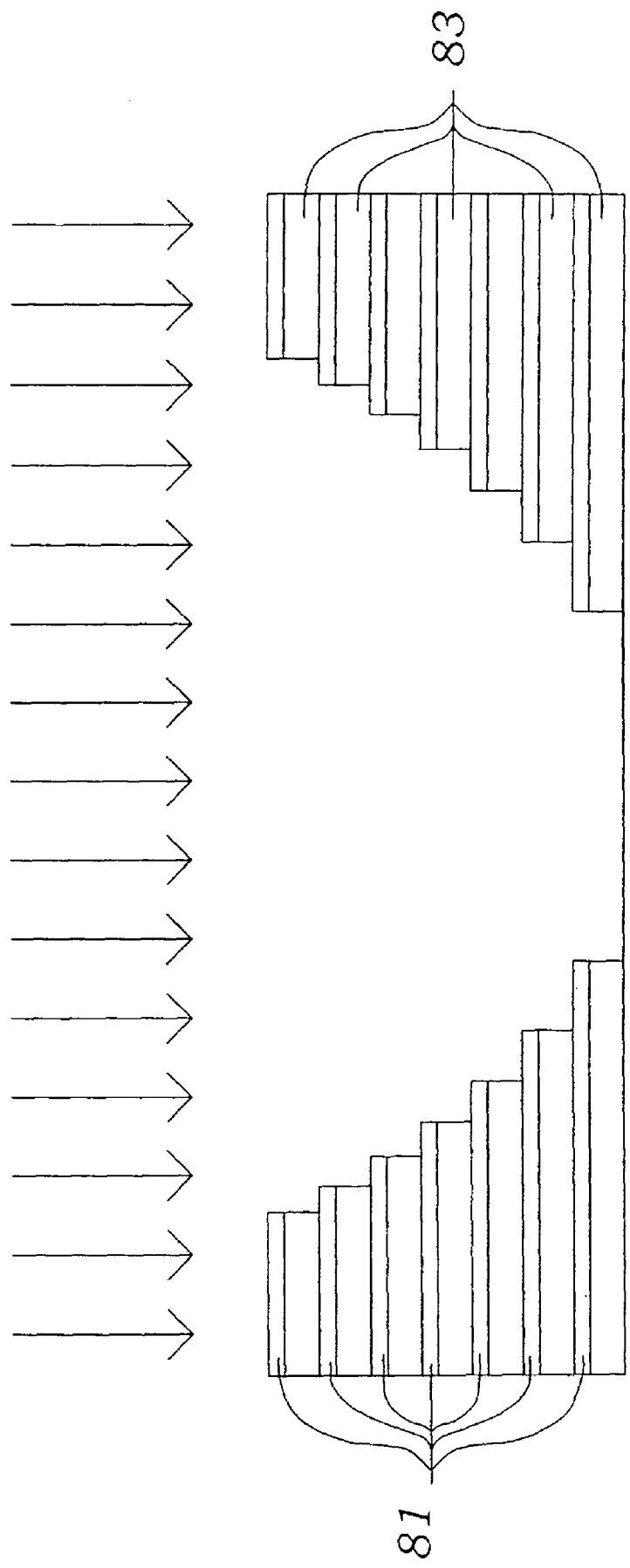

FIGS. 9a and 9b illustrate cross-sectional views of an alternative method for fabricating the light control material of the present invention. Material layers 81 and 83 have essentially the same etch rates for a wet etching process. Therefore, once the photoresist has been exposed to ultraviolet light through a mask (not shown) and the exposed areas 86 of the photoresist layer 82 have been developed away, a chemical etch is applied to the exposed areas in material layer 81 which etches the material layers substantially isotropically, as shown in FIG. 9a. The photoresist layer is then removed and a dry etching process is used which etches material layers 83 but which does not etch material layers 81. The dry etching process (e.g., ion beam milling) etches material layers 83 anisotropically thereby providing the clipped effect illustrated in FIG. 9b.

Figure 10A:
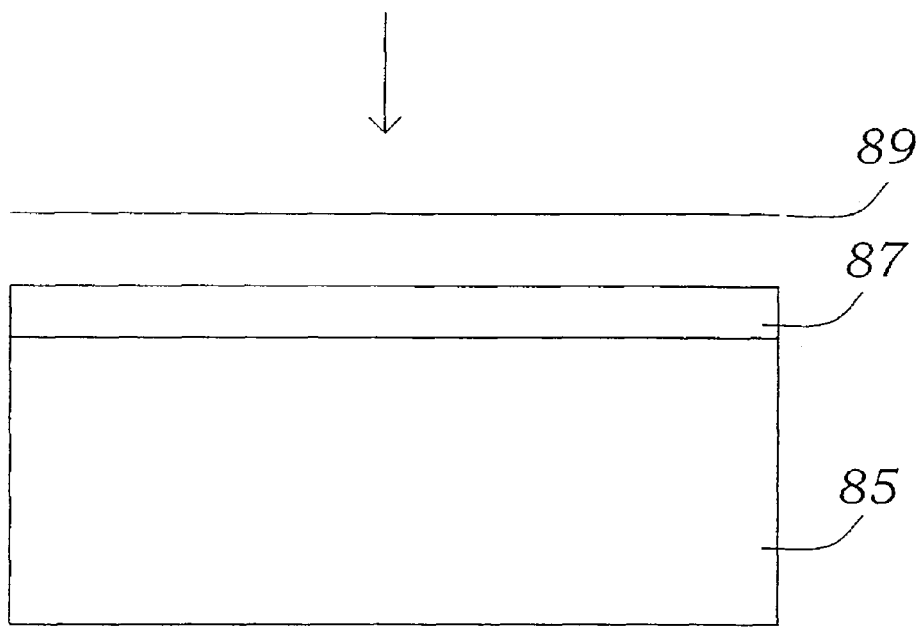
FIGS. 10a-10c illustrate another alternative embodiment for creating the light control material of the present invention.
Figure 10B:
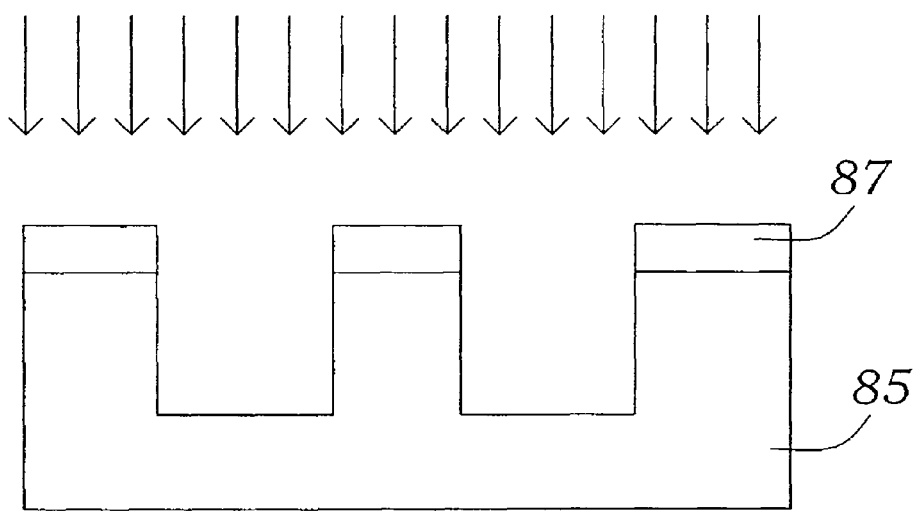
Figure 10C:
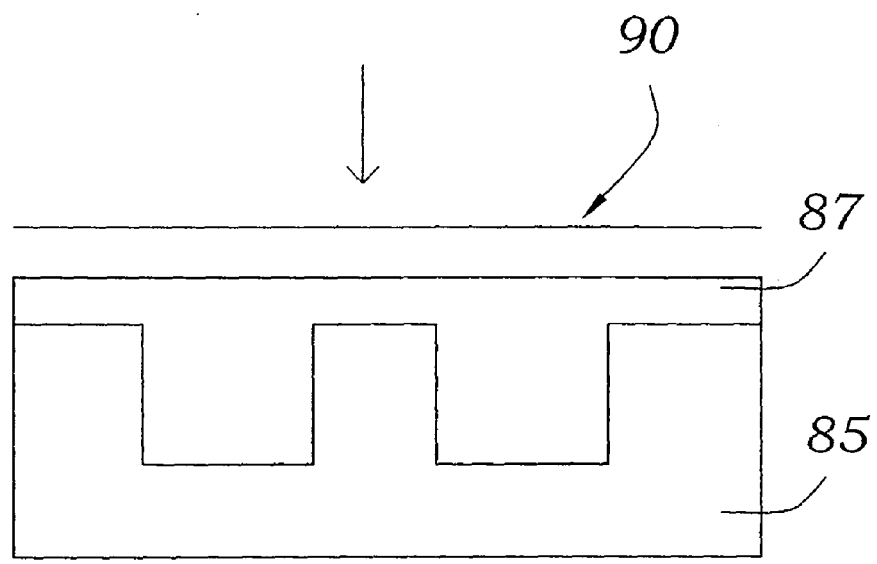
Figure 10D:
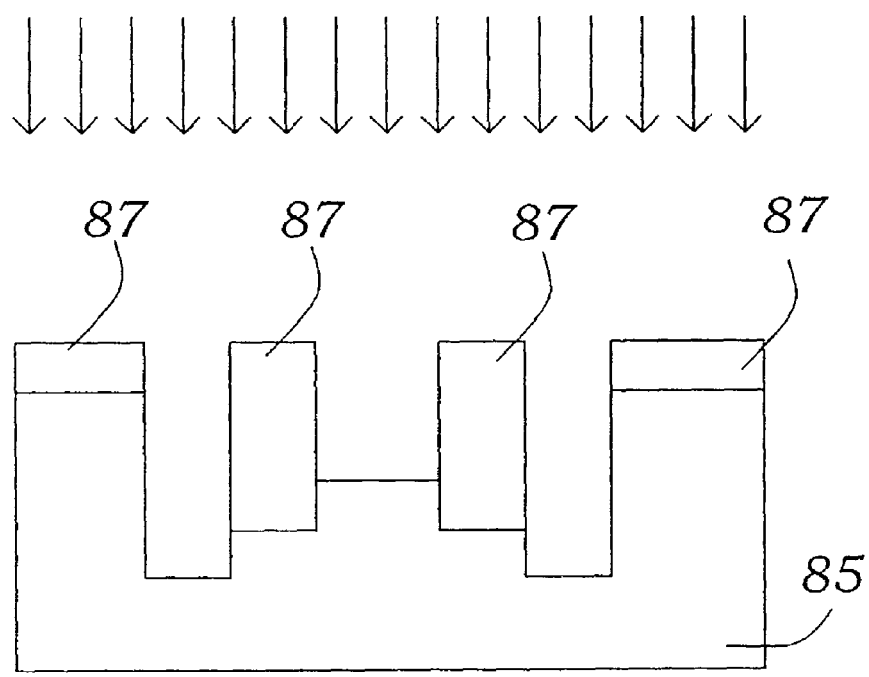

FIGS. 10a-10e illustrate cross-sectional views of a further embodiment for achieving the stepped structures of the present invention. An etchable substrate 85, such as quartz or silicon, is coated with a layer of photoresist 87. The photoresist is then exposed to ultraviolet light through mask 89. The exposed areas of the photoresist are developed away and a dry etching process is utilized to etch a certain distance down into substrate 85, as shown in FIG. 10b. The remaining photoresist is then stripped away and another layer of photoresist is uniformly applied, as shown in FIG. 10c. The photoresist layer 87 is then exposed to ultraviolet light through mask 90 and the exposed areas are developed away, as shown in FIG. 10d. The dry etching technique is then used to etch a distance into the substrate which is half the distance etched in the previous dry etching step, also shown in FIG. 10d. The remaining photoresist layer is stripped away and a new layer of photoresist is applied (not shown). The photoresist layer is then exposed to ultraviolet light through a mask and the exposed areas are developed away leaving only selected areas of the substrate 85 covered with the photoresist 87. The device is then subjected to another dry etching step which etches the substrate a distance equal to half of the distance of the previous dry etch as shown in FIG. 10e. The photoresist is then removed and the resulting device has the stepped structure formed therein. The device of FIG. 10e can then be used as a master, from which embossments can be generated in the manner discussed above with respect to FIGS. 4d and 4e. The device of FIG. 10e can also be electroplated with metal such as nickel to form a metallic master.

Figure 11:
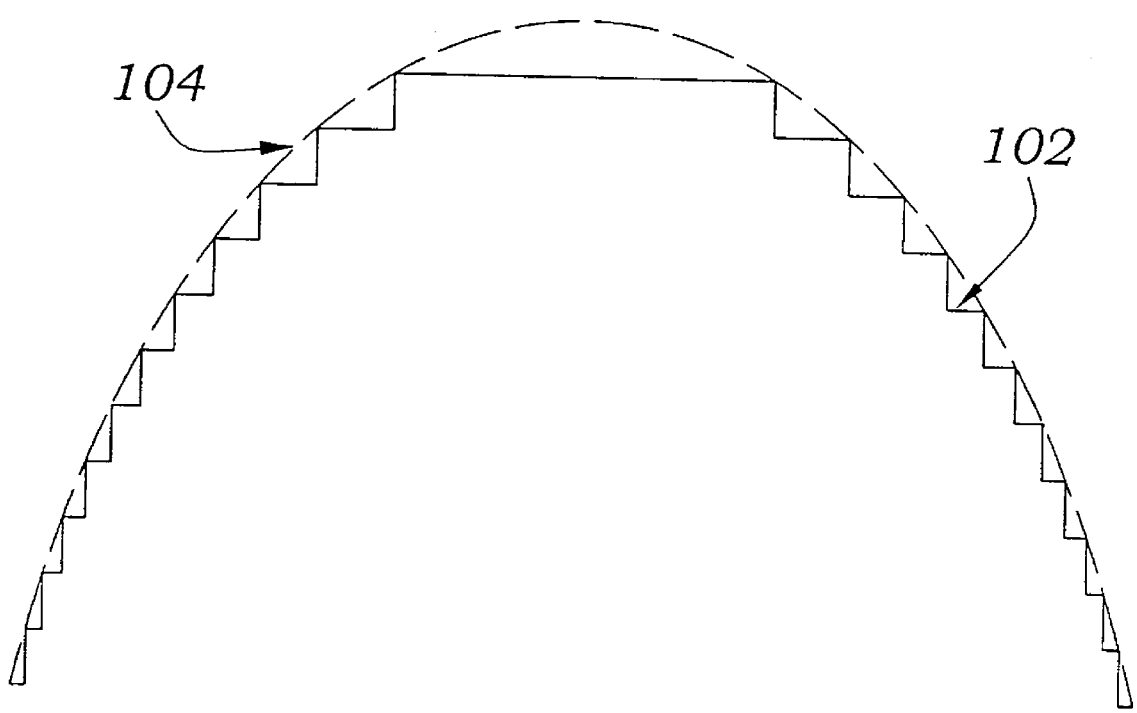
FIG. 11 illustrates a microstructure having a generally parabolic profile in accordance with another alternative embodiment of the present invention.

As illustrated in FIG. 11, the microstructures of the present invention may be advantageously shaped with the steps 102 distributed along a generally parabolic profile 104 analogous to that of a stereotypical "beehive." The parabolic profile 104 allows the surface area of each step 102 to be substantially the same. This ensures that the amount of light reflected by each step 102 is approximately the same, maximizing the beneficial effects of constructive interference of the reflected light from the plurality of steps. The parabolic profile can be constructed, as previously described, by applying successive layers of photoresist each having a surface area and thickness selected to create a parabolic profile and then etching the structure into a silicon substrate via reactive ion etching to enlarge the step height to a desired value.

Figure 12A:
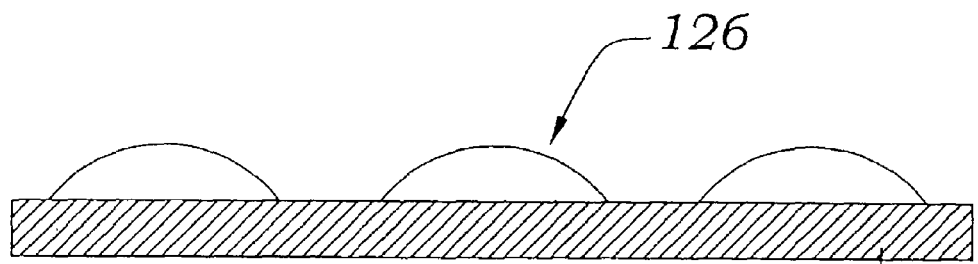
FIGS. 12a-12f illustrate an exemplary method for producing a microstructure in accordance with yet another embodiment of the present invention.
Figure 12B:
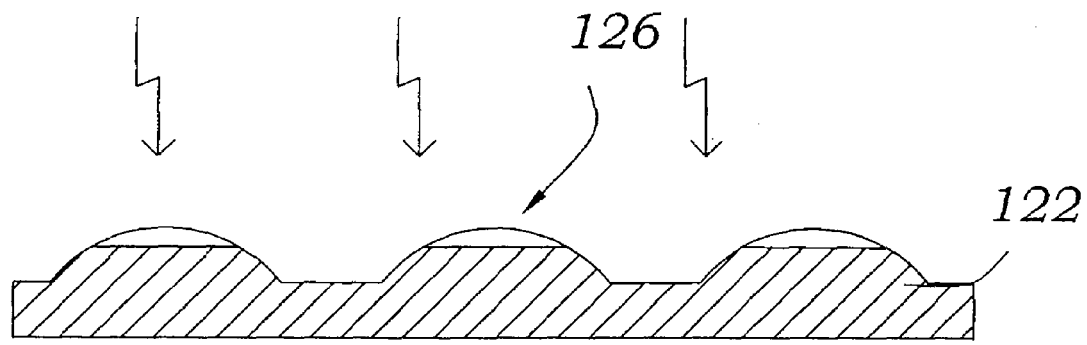
Figure 12C:
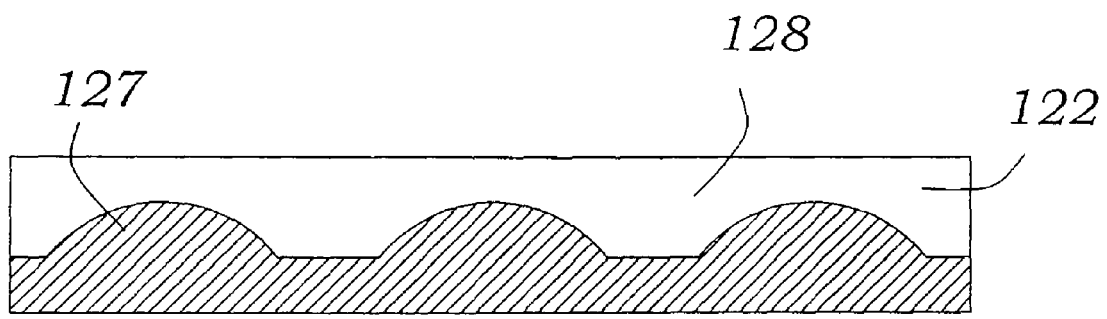
Figure 12D:
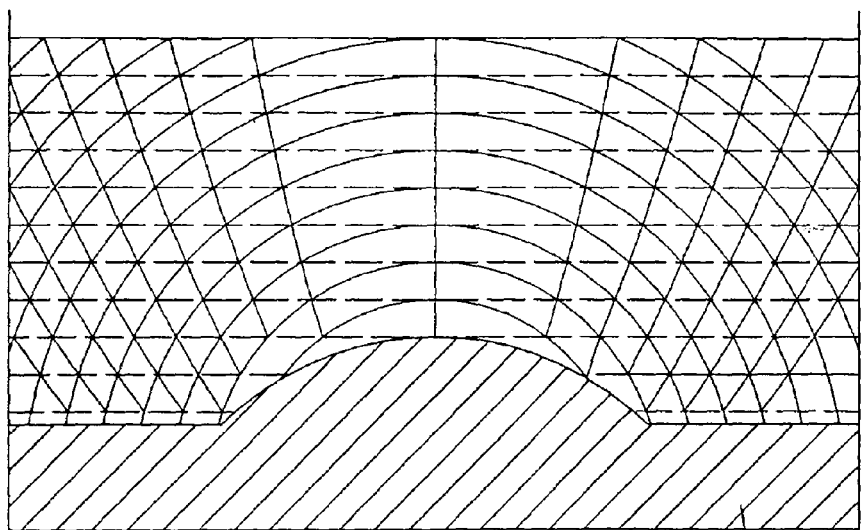
Figure 12E:
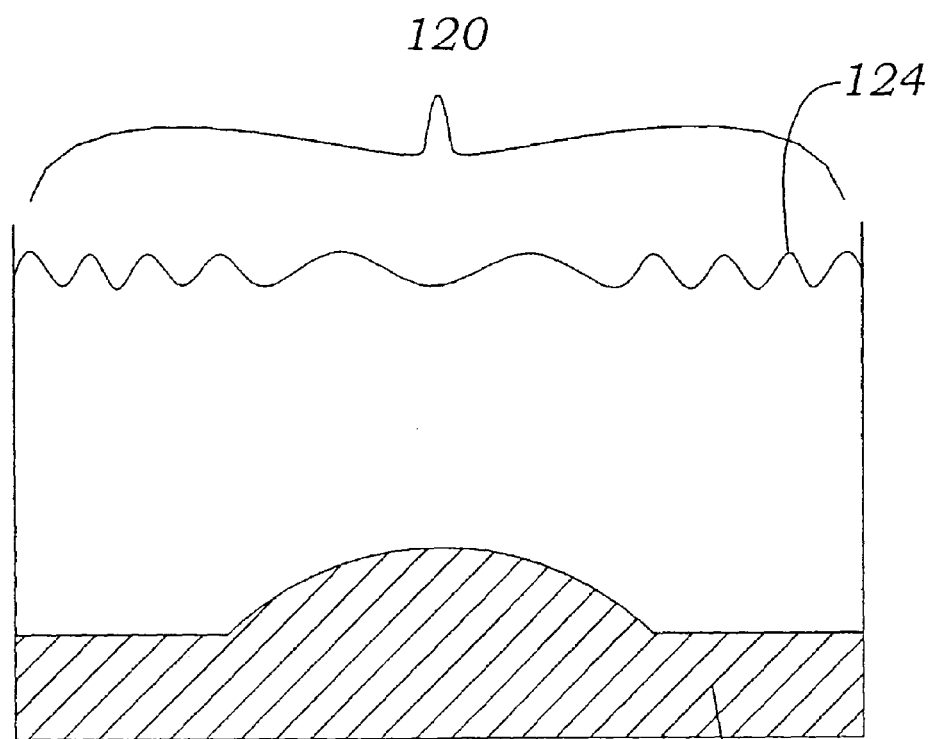
Figure 12F:
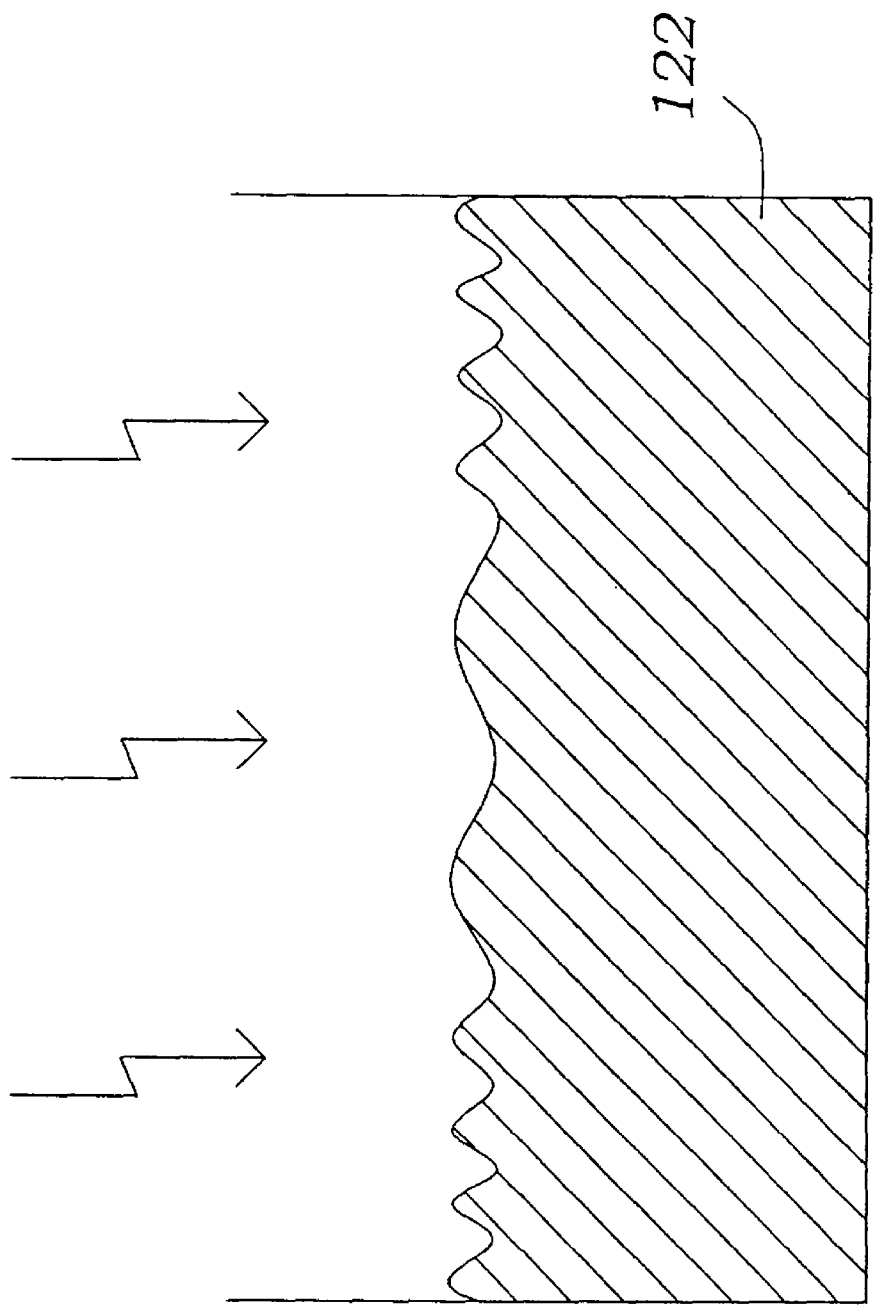

The stepped structure of the invention can alternatively be created by direct photoresist exposure with a grayscale mask. The grayscale mask represents the step heights of the desired microstructure as different gray levels. When this mask is used for a contact exposure of photoresist the gray levels of the mask modulate the intensity of the collimated UV light used to expose the photoresist, transforming the grayscale pattern into a photoresist exposure pattern. When this resist is developed the areas receiving the highest exposure etch away most quickly, while areas receiving a lower exposure etch away more slowly, producing the desired stepped microstructure. The etch depth obtained in any particular spot depends on the optical and chemical properties of the photoresist, the mask properties, the exposure conditions, and the linearity of the development process. A similar approach is to use a modulated laser to directly write varying levels of exposure patterns into the resist, providing higher exposure where the desired step is deeper in the resist and lower exposure where the desired step is nearer the surface of the undeveloped resist. In both of these alternative methods the microstructured photoresist surface that results after development can be used to make metal tooling, as previously detailed, and thence to create polymer replicas. In another alternative embodiment of the present invention, illustrated in FIGS. 12a-12f, concentrically periodic vertical relief microstructures 120 can be constructed on a substrate 122 without sequentially rising at each step. Instead, each microstructure 120 has vertically rising ridges 124 that drop back to the base substrate level as illustrated in the cross-sectional view of FIG. 12f. The concentric ridged structure 120 is formed via the method illustrated in FIGS. 12a-12f. First, photoresist bumps 126 are deposited upon a silicon substrate 122 (FIG. 12a). The photoresist bumps 126 and substrate 122 are then subjected to reactive ion etching (FIG. 12b), which degrades the silicon substrate 122 at a higher rate than the photoresist bumps 126, magnifying their vertical relief as discussed in relation to FIGS. 6a and 6b to form reflective lenses 127 on the silicon surface (FIG. 12c). The silicon substrate is then coated with a layer of photoresist 128 (FIG. 12c) and exposed to light having a desired wavelength. The resulting interference fringes create a curved waveform in the photoresist 128 (FIG. 12d). Upon development, the photoresist forms a concentric ridged structure, which may include concentrically curved ridges (FIG. 12e). A final reactive ion etching step (FIG. 12f) serves to etch the concentric ridged pattern 120 into the silicon substrate and allows for alteration of the vertical height of the pattern to match one half the wavelength of a desired color of light to be reflected, in a manner similar to that previously discussed in relation to FIGS. 6a and 6b.

Figure 13A:
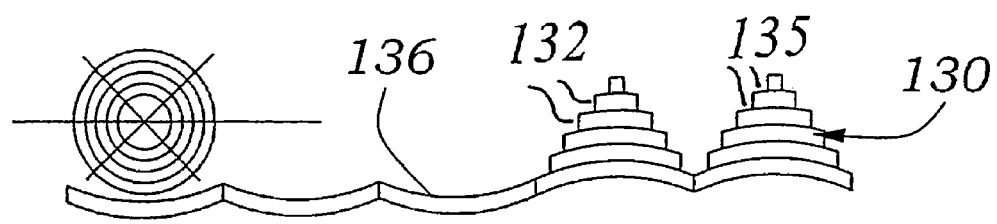
FIGS. 13a-13c illustrate an exemplary method for creating non-planar, substantially concentric curved microstructures having an increased field of view in accordance with another embodiment of the present invention.
Figure 13B:
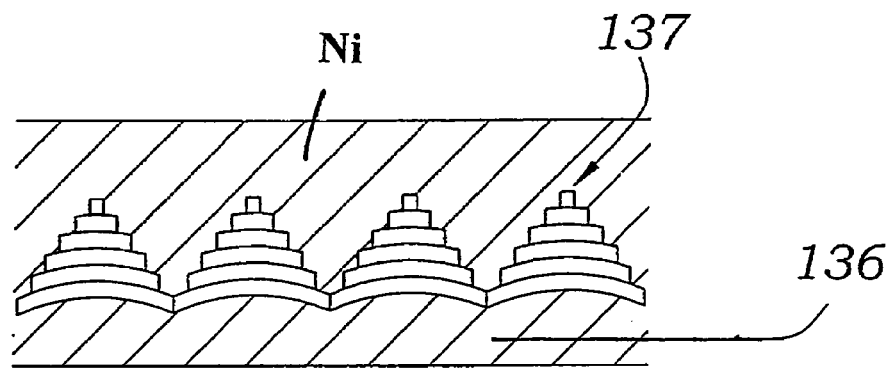
Figure 13C:
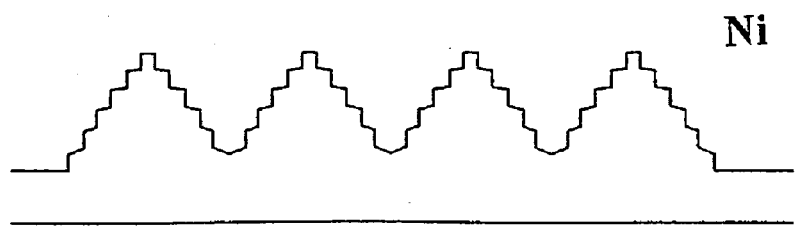

Similarly, as illustrated in FIGS. 13a-13c, in an alternative exemplary embodiment stepped microstructures 130 of the present invention may also be adapted to incorporate non-planar, substantially concentric curved surface steps 132. The curved surface steps 132 provide a focal point 134 from which the reflected light appears to emanate. This focal point can be seen from many different angles, depending on the details of the specific microstructure, and it enables control of the field of view of the zone of uniform color display. Other variations on the subject invention include combinations of curved steps of different step heights to produce different stable colors in different viewing directions, and planar steps with curved steps to produce angularly variable tints across a base color.

As shown in FIGS. 13a-13c, the curved step microstructures 130 can be constructed using a reflective microlens array 136 as a pattern of point sources for the construction of curved, concentric shell steps 132. This is accomplished by first forming a plurality of reflecting focusing surfaces 135 into a reflective surface 136, then coating and exposing a layer of photoresist 137 on top of the reflecting focusing surfaces 135 to create curved wavefront interference patterns in the resist. Reactive ion etching or ion beam milling may then used to transfer the pattern into the silicon substrate 136, creating the structural color curved steps 132 having the domed profiles of the reflectors. Once created, the etched structure having the desired shape can then be coated with a metal, such as nickel, to create a metallic mold (FIGS. 13b and 13c). The resulting mold can then be used to create multiple embossment copies of the original silicon structure.

In all of the methods described which incorporate a reactive ion etching step, alternative dry etching methods, such as ion beam milling, could be substituted.

Figure 14A:
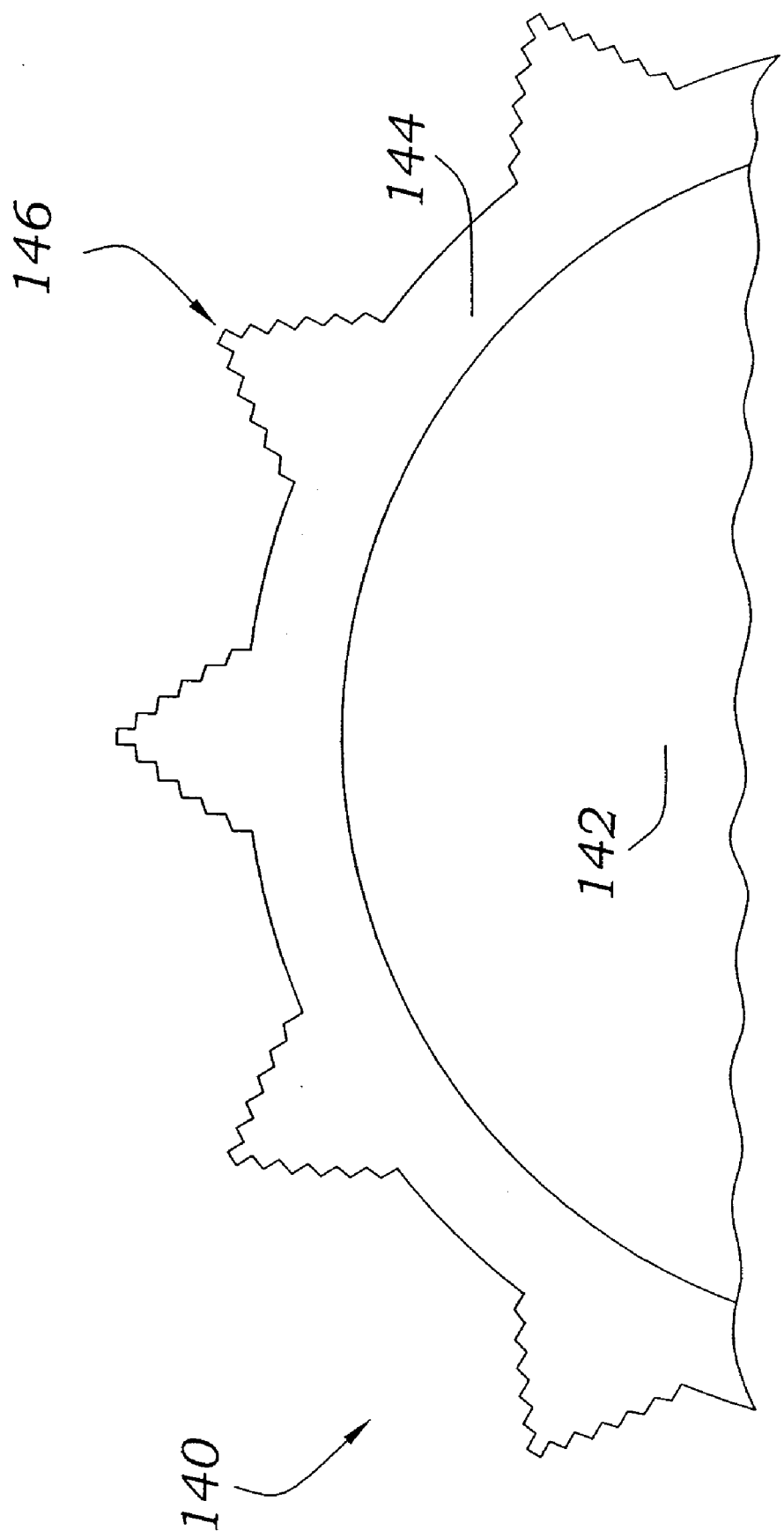
FIGS. 14a-14c illustrate fibers bearing periodic microstructures in accordance with yet another embodiment of the present invention.
Figure 14B:
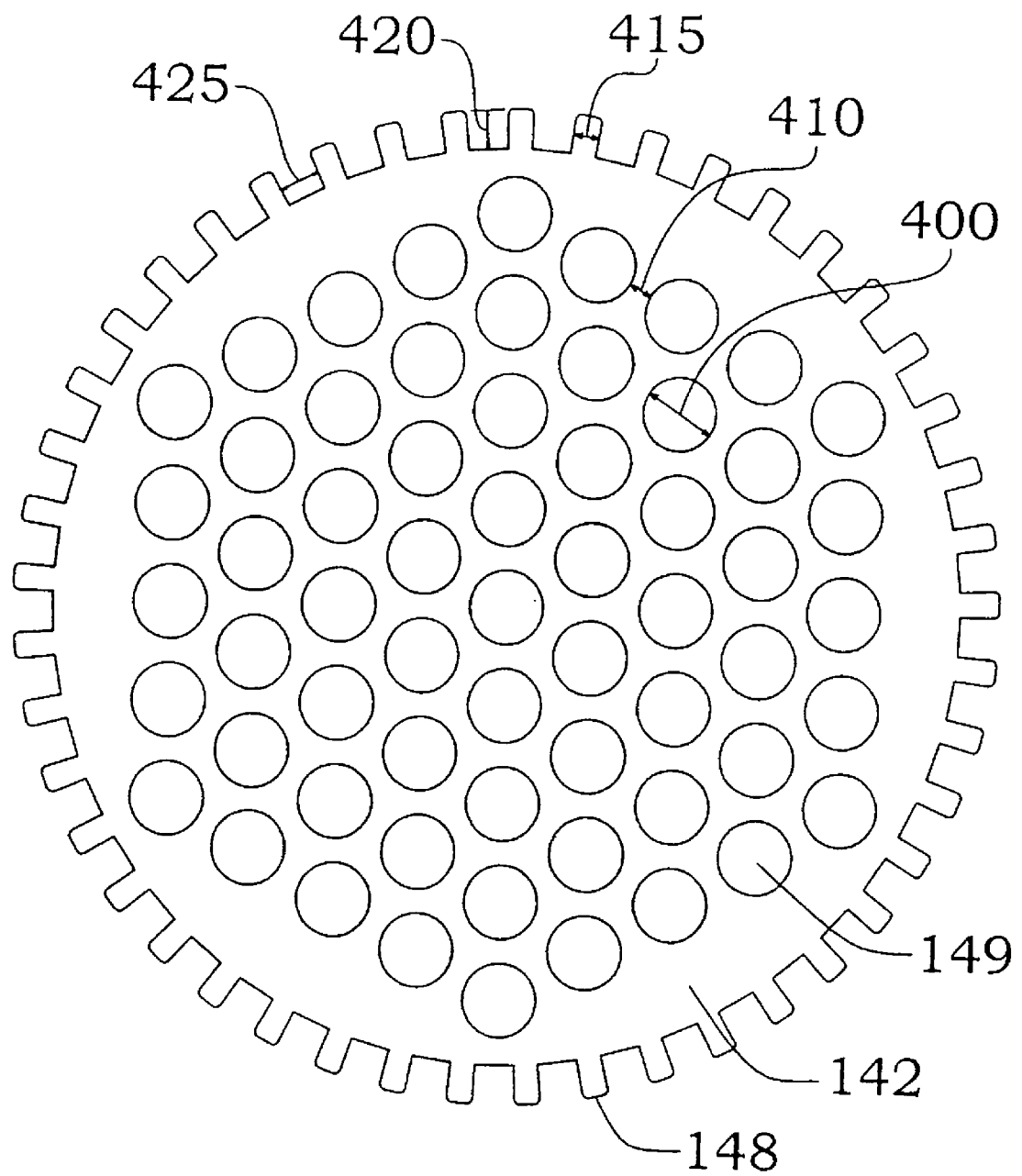
Figure 14C:
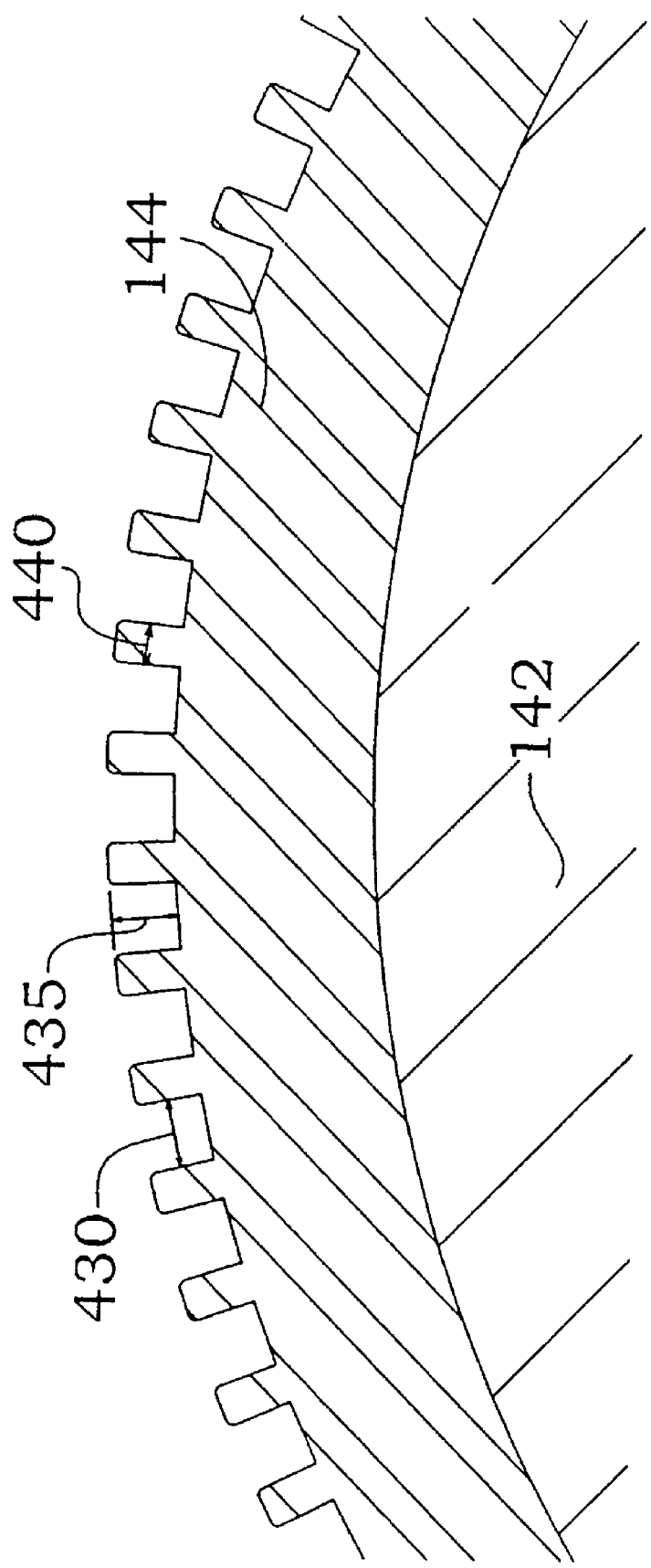
Figure 20A:
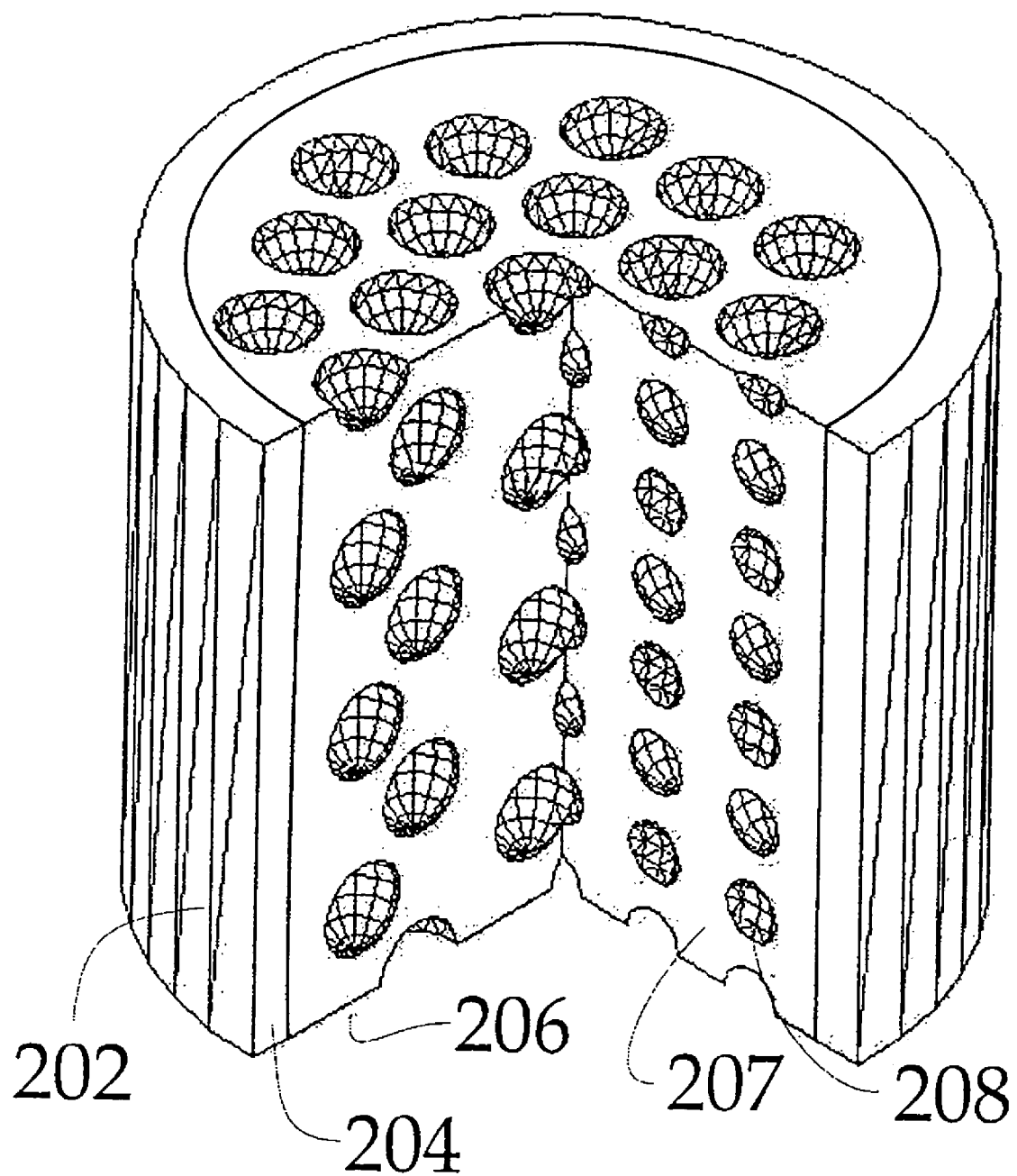
FIGS. 20a-20b illustrate color selective photonic crystal fibers in accordance with yet a further embodiment of the present invention.
Figure 20B:
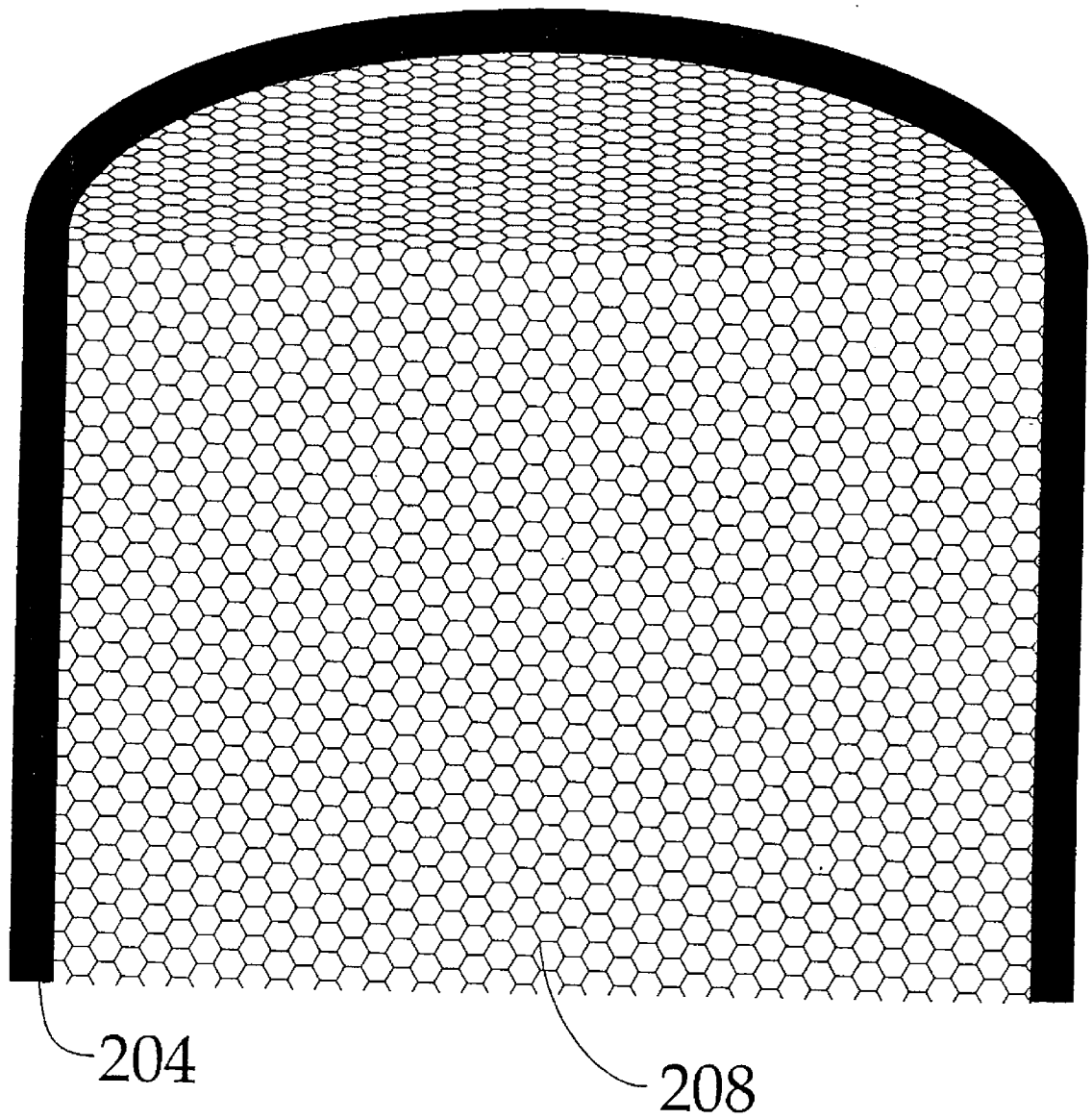

In accordance with yet another embodiment, the light control material of the present invention may also be constructed as a color fiber 140. As illustrated in FIGS. 14a-14c, the fibers 140 can be produced by coating a core fiber 142 with a surface material 144 having either stepped surfaces 146 or ribbed surfaces 148. The core fiber 142 is preferably constructed with a linear photonic crystal structure, or from an opal or inverse opal photonic crystal structure as illustrated in FIGS. 20a-20b. A linear photonic crystal structure is a repeating array of cylindrical or tubular structures arranged in a hexagonally symmetric pattern inside a matrix of dielectric material. FIG. 14b illustrates a linear inverse opal fiber with a structural reflection enhanced surface. The dimensions and properties of the parts of the photonic crystal structure, including the number of tubes 149, the spacing 410 of the tubes 149, the symmetry of the tube pattern, the refractive index of the cylindrical structures, and the refractive index of the dielectric material between the cylindrical structures work to determine the central wavelength and bandwidth of light reflected. In an exemplary embodiment the diameter 400 of the tubes 149 is designed to be equal to the wavelength of the desired color, and the spacing between the tubes is designed to be equal to ½ of the wavelength of the desired color further divided by the dielectric constant of the core material 142 ($\lambda/2\eta$). Air is a preferred material for use in the cylindrical structures and a polymer is a preferred matrix material.

For example, the ribs 148 can have a height 420, 435 and spacing 425, 430 of ½ of the wavelength, $\lambda$, of the desired color. The width 415, 440 of the ribs can be designed to be ½ of the wavelength of the desired color further divided by the dielectric constant of the material ($\lambda/2\eta$).

The stepped 146 and/or ribbed 148 fiber surface structures are disposed adjacent the linear photonic crystal core 142 and may be used individually or combined with one another for additional efficiency or bandwidth broadening effects. As illustrated in FIG. 14*c*, the ribbed fibers 148 can be dimensioned to provide constructive interference for illumination falling normal to the fiber surface as well as a multi-layer interference effect for illumination falling tangentially to the fiber surface.

Figure 15:
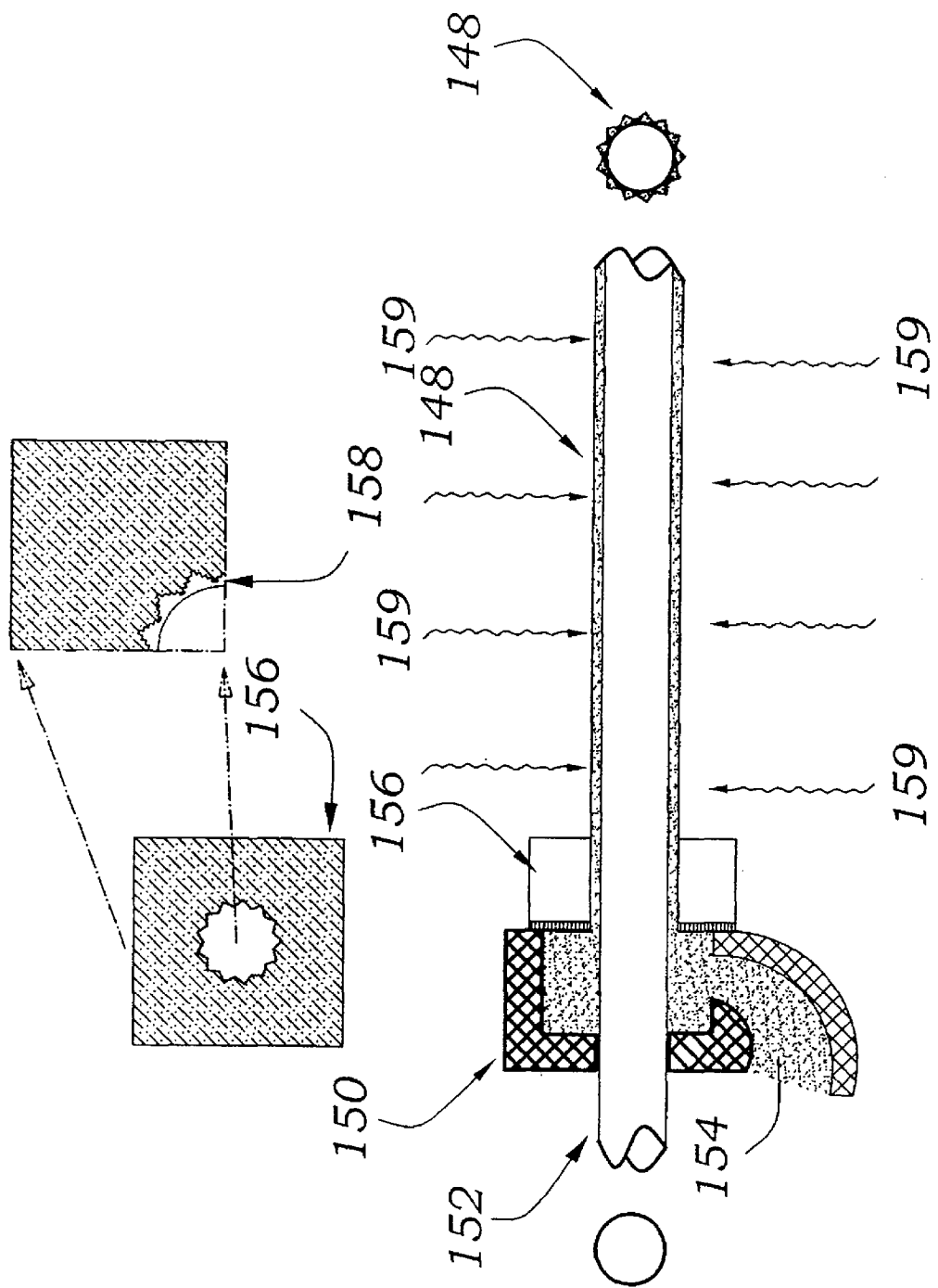
FIG. 15 illustrates a representative method for producing the fibers bearing color microstructures in accordance with the embodiments of FIGS. 14a-14c.

The color fibers of FIGS. 14*a*-14*c* may be manufactured in an extruder 150, as shown in FIG. 15. A core fiber 152 is fed into extruder 150 and coated with a photopolymer 154. Either the fiber 152 or the photopolymer 154 can be pigmented. The fiber and photopolymer coating are then forced through a quartz die 156 which includes a negative mold of linear structural color microstructures 158 (see inset) and exposed to high intensity ultraviolet radiation 159 to cure the photopolymer followed by an ultraviolet UV post-curing step. Alternatively, the color fibers of FIGS. 14*a*-14*c* may also be created by pressure assisted extrusion and drawdown of individual tubes that can be joined, embedded and co-extruded with a second polymer. Yet another alternative for manufacturing the color fibers of FIGS. 14*a*-14*c* is by fiber spinnerette extrusion, wherein the internal form of the spinnerette nozzles provides the linear surface structure of the spun fibers.

A three dimensional photonic crystal microstructure to provide color effects is shown in FIGS. 20 and 21. FIG. 20*a* illustrates the incorporation of a photonic crystal microstructure to a polymer fiber 202. Fiber 202 includes a solid polymer sheath 204 and a foamed polmer core 206. Foamed polymer core 206 incorporates two different materials, lattice substrate 207 and lattice inclusions 208. The optical refractive indices of the lattice substrate 207 and the lattice inclusions 208 are non-identical. In the exemplary embodiment, the lattice inclusions 208 are arranged in a substantially regular three dimensional crystalline structure, preferably a face-centered cubic structure. The lattice spacing is on the order of the desired wavelength of light to be reflected.

The bandwidth and efficiency of the reflection spectrum of fiber 202 is affected by the relative volumes of lattice substrate 207 and lattice inclusions 208, as well as the relative optical refractive indices of 207 and 208. In a preferred embodiment, the lattice substrate 207 is formed from a polymer having a refractive index in the range from 1.4 to 1.65 and the lattice inclusions are formed from a gas having a refractive index on the order of 1. In this embodiment, the lattice inclusions 208 can take the form of gas bubbles in the lattice substrate 207. FIG. 20*a* illustrates an embodiment in which the size of the lattice inclusions 208 is relatively small compared with the period of the photonic crystal structure.

FIG. 20*b* illustrates an embodiment in which the size of the lattice inclusions 208 is nearly equal to the period of the photonic crystal structure. In the case of gas bubbles forming the lattice inclusions 208, the bubble shapes will differ between these two embodiments. In the first embodiment, bubbles of uniform size will take on a substantially spherical form, while in the latter embodiment bubbles of uniform size will distort into dodecahedral form with a thin membrane of lattice substrate 207 separating them.

Gas filled lattice inclusions 208 can be formed in a polymer lattice substrate 207 by many different methods. A gas such as nitrogen, carbon dioxide, or water vapor can be dissolved under pressure into the polymer lattice substrate 207 when this material is in a molten state. If a fiber 202 is formed or coextruded having this as a core 206 material, then it may be caused to foam upon release of hydrostatic pressure. The bubbles thus formed may naturally arrange themselves into an inverse opal photonic crystal pattern. External means can also be employed to provide the regular patterning of bubbles needed, such as by imposing an interference pattern of ultrasound in the core, causing bubble formation at the antinodes of the ultrasonic interference pattern. Optical interference patterns can also be used for the same purpose.

Another method for creating gas filled lattice inclusions 208 is to incorporate a uniformly dispersed photodissociating powder into polymer lattice substrate 207. After coextrusion, while the core of the fiber is still hot and plastic, the fiber is exposed to light illumination of the appropriate energy and wavelength to induce the photodissociating powder to dissociate into gas, forming uniformly sized and distributed gas bubbles.

The photonic crystal microstructure in which the lattice inclusions 208 are formed from a lower refractive index material in a lattice substrate 207 having a larger refractive index, and in which the lattice inclusions 208 are substantially arranged in a close-packed hexagonal pattern, is called the 'inverse opal' photonic crystal structure. The reverse case, in which lattice inclusions 208 are formed from a higher refractive index material in a lattice substrate 207 formed from a lower refractive index material, and in which the lattice inclusions 208 are substantially arranged in a close-packed hexagonal pattern, is called the 'opal' photonic crystal structure. Both of these photonic crystal structures will provide selective color reflection effects over a wide range of viewing and illumination angles.

Other photonic crystal structures may be attained to achieve selective color reflection effects, such as the so-called 'diamond' photonic crystal structure. This structure can be formed by block copolymer materials. Block copolymers form an interpenetrating three dimensional 'diamond' structure by the mixing of two non-miscible polymers. Block copolymer materials can show selective color reflection effects that depend on the dimensions of the interpenetrating structures and their relative refractive indices. Block copolymer photonic crystal structures can be formed into fibers to attain selective color effects in the fibers.

Figure 21A:
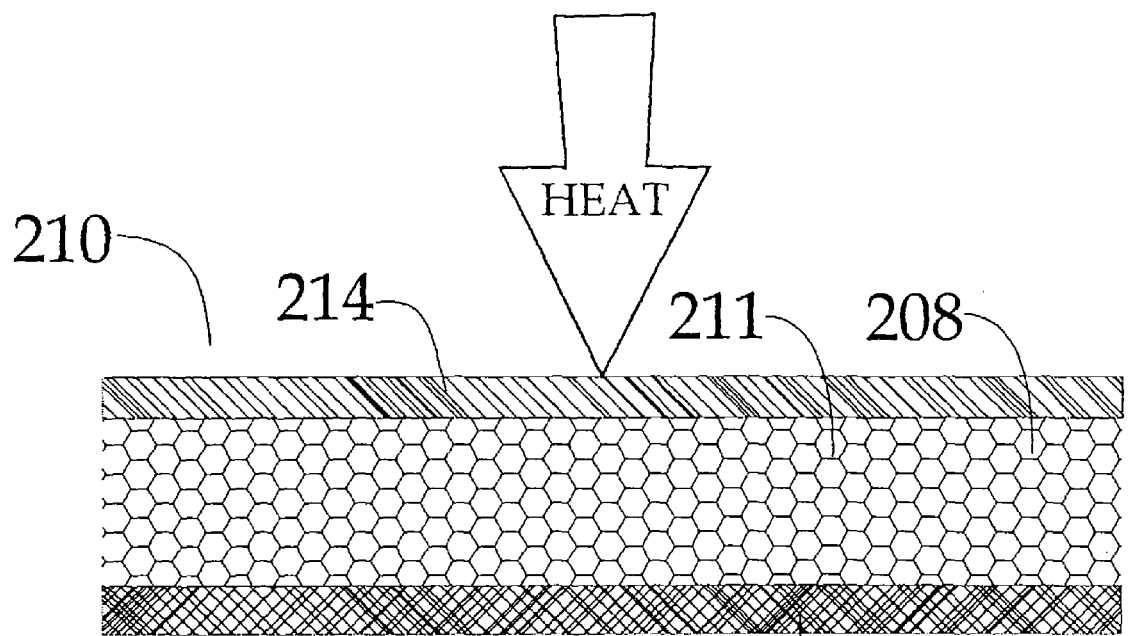
FIGS. 21a-21b illustrate an imaging substrate incorporating a photonic crystal structure of yet another embodiment of the present invention.
Figure 21B:
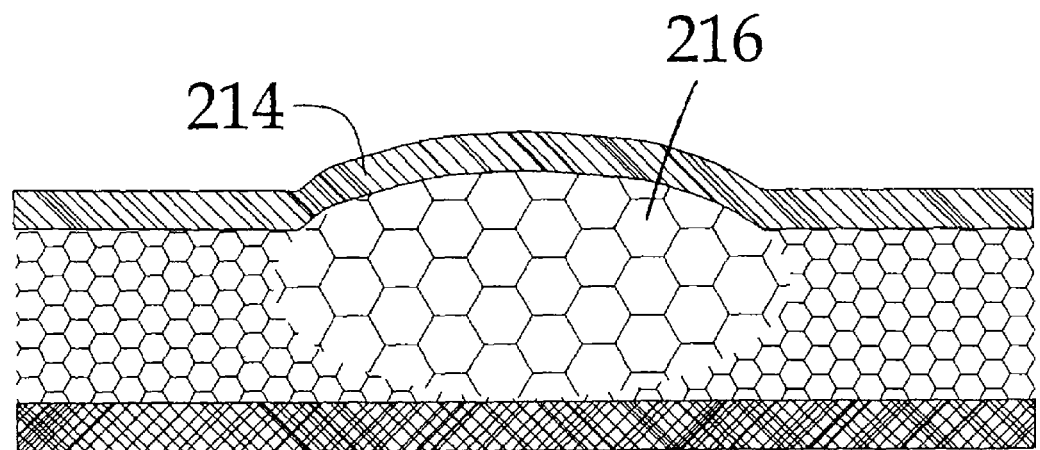

FIGS. 21*a* and 21*b* illustrate the application of a photonic crystal structure in an imaging substrate. Imaging substrate 210 includes a base 212 which may be black, white, or colored, a photonic crystal foam 211 incorporating substantially uniform gas filled lattice inclusions 208 and polymer lattice substrate 207, and a transparent film upper surface 214. FIGS. 21*a* and 21*b* illustrate how this embodiment can be used to display color patterns and images. In FIG. 21*a*, a region of the imaging substrate 210 is subjected to a controlled pulse of heat, preferably from an infrared diode laser. When the heat is absorbed by the photonic crystal foam 211 the polymer lattice substrate 207 softens and the gas filled lattice inclusions 208 expand, thereby causing the heated region to expand. As the heated region of photonic crystal foam 216 cools it may shrink from its maximum expansion, but will harden in an expanded state. Selective color effects are obtained by designing the photonic crystal foam 211 dimensions to reflect ultraviolet light. Expansion of the photonic crystal foam 211 to its final state 216 increases the period of the photonic crystal lattice, and therefore lengthens the wavelength of the light it preferentially reflects. A small expansion will produce colors in the blue region of the spectrum, a larger expansion will produce colors in the green or yellow region of the spectrum, and an even larger expansion will produce colors in the orange, red, or infrared region of the spectrum.

Figure 22:
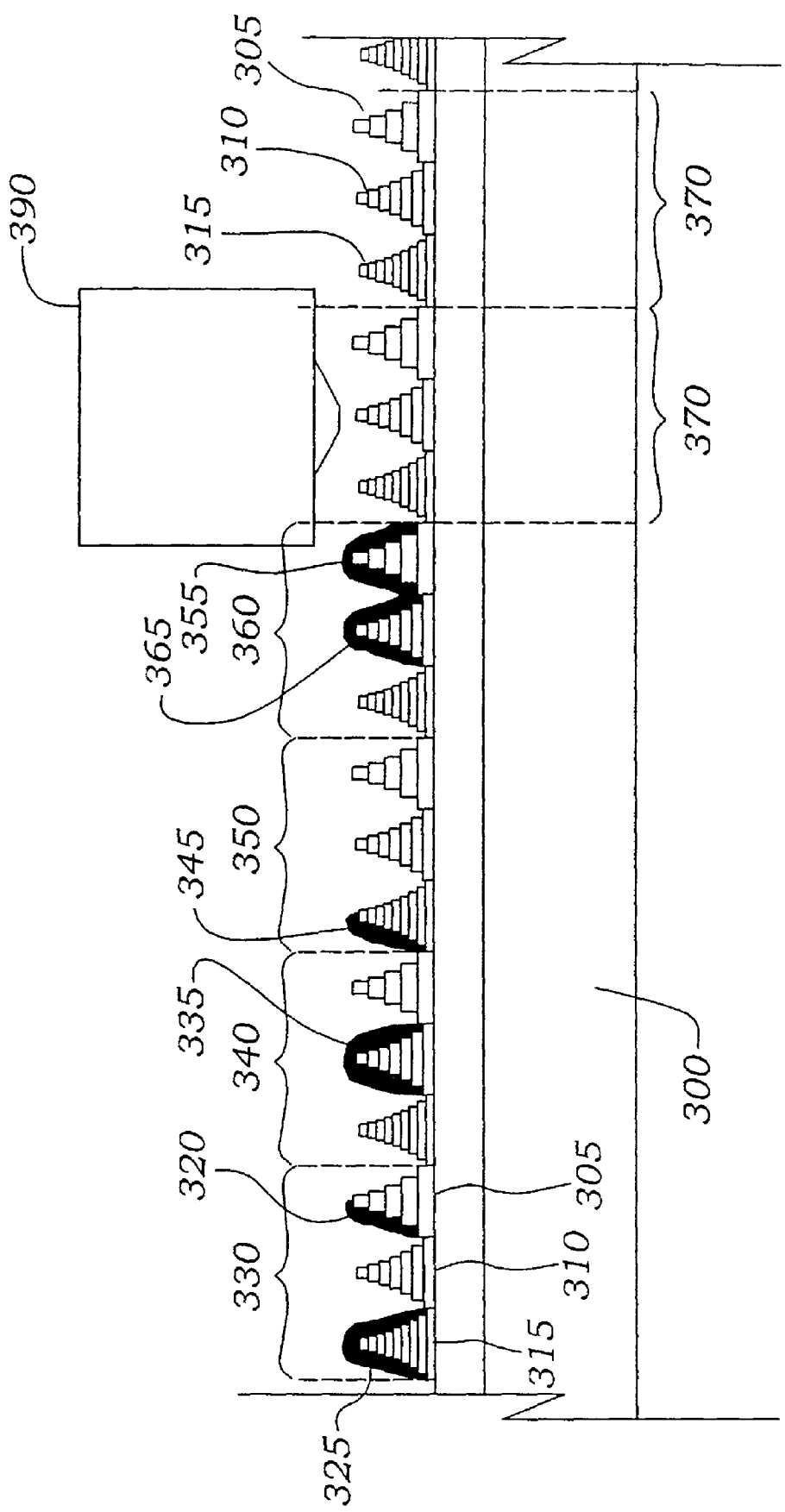
FIG. 22 illustrates an exemplary embodiment the invention which utilizes an ink deposition system, preferably a black ink inkjet printhead, to deposit dots of ink on the microstructured substrate to print an image.

As has been stated, one embodiment of the invention utilizes an ink deposition system, preferably a black ink inkjet printhead, to deposit dots of ink on the microstructured substrate to print the image, illustrated in FIG. 22. This method is unique because the ink dots are used to modulate the intensity of the color microstructures and to "reveal" the image from the originally white appearing substrate. Although a single color of ink may be used, such as black, a full additive color image results.

The microstructured substrate 300 includes triads or triplets 370 of red reflecting stepped microstructures 305, green reflecting stepped microstructures 310, and blue reflecting stepped microstructures 315. Each triplet 370 represents one color pixel of the image. A pigmented material deposition system, such as a dye sublimation head, or perferably a high resolution inkjet printhead 390, deposits controlled spots of ink, such as 320, 325, 335, 345, 355, and 365, to selectively cover color reflecting microstructures 305, 310, and 315.

Multiple examples of this printing method are illustrated in FIG. 22. Color triad 330 is shown as having ink 320 partially covering red microstructure 305 and ink 325 completely covering blue microstructure 315, resulting in an additive color reflection of yellow-green for this triad. Color triad 340 is shown as having ink 335 completely covering green microstructure 310, resulting in an additive color reflection of magenta for this triad. Color triad 350 is shown as having ink 345 partially covering the blue microstructure, resulting in an additive color reflection of unsaturated yellow for this triad. Color triad 360 is shown as having ink 355 completely covering the red microstructure and ink 365 completely covering green microstructure, resulting in an additive color reflection of saturated blue for this triad. Color triads 370 are unmodified, so they present an additive color reflection of white.

In effect, the ink is used to cover up the color inverted image dots which mask the viewer's perception of the desired color image dots. The additive sum of the color inverted image and the desired color image makes white. To reveal the desired image (by any of these methods) it is simply necessary to modify, obliterate, obscure, or cover up the microstructure image dots representing the inverse color image.

Other methods of depositing a pigmented or opaque material can be similarly employed, such as electrodeposition of toner particles, silkscreen printing, dye sublimation printing, and photographic darkening of a silver halide emulsion overcoat. Active methods of controlling the visibility of these color reflecting microstructures can also be employed to create a display device, such as by incorporating this microstructured material into the back plane of a grayscale liquid crystal display, utilizing the controllable opacity of the liquid crystal to modulate the visibility of the color reflecting microstructures.

An alternative embodiment of this imaging substrate can be created by incorporating substantially monodisperse thermally activated gas-generating particles into a base thermopolymer formed into a substrate. Localized heating of the polymer to its melting point simultaneously causes the heated gas-generating particles to generate a uniform volume of gas centered around each particle, creating a foam of uniform void size. Foams having uniformly sized voids spontaneously assemble into a close-packed lattice, forming a photonic crystal structure, which is frozen in place after cooling. Color control is obtained by regulating the size of the voids through control of the heating power and duration. The color of a heated region can therefore be controlled by the intensity or duration of heating. In combination with a system for providing controlled patterns of heating (such as the computer controlled laser diode writing head described in further detail in connection with FIGS. 19a-19c), imaging substrate 210 constitutes a means to produce monochromatic or color printed information, images, and data which is not subject to fading by exposure to ultraviolet light. Furthermore, such an imaging or 'printing' system can produce any selected pure color. Environmental advantages of such a system include elimination of solvent emissions and eliminating the need for toners or inks.

It should be noted that, although the preferred embodiments of the present invention are generally directed to creating a master and generating embossments therefrom, the methods discussed above for creating the master can also be used to directly create color images, i.e., it is unnecessary to first create a master and then generate embossments therefrom. The primary advantage of creating a master and generating embossments from the master is that the methods discussed above can be used to create one physical structure having complete color information permanently recorded therein and then embossments which contain this color information can be easily and inexpensively produced from the master.

The following embodiments of the present invention are directed to different methods for creating an embossed device, or light control material, which displays a color image from a master that has been fabricated in accordance with any of the embodiments discussed above.

Figure 16:
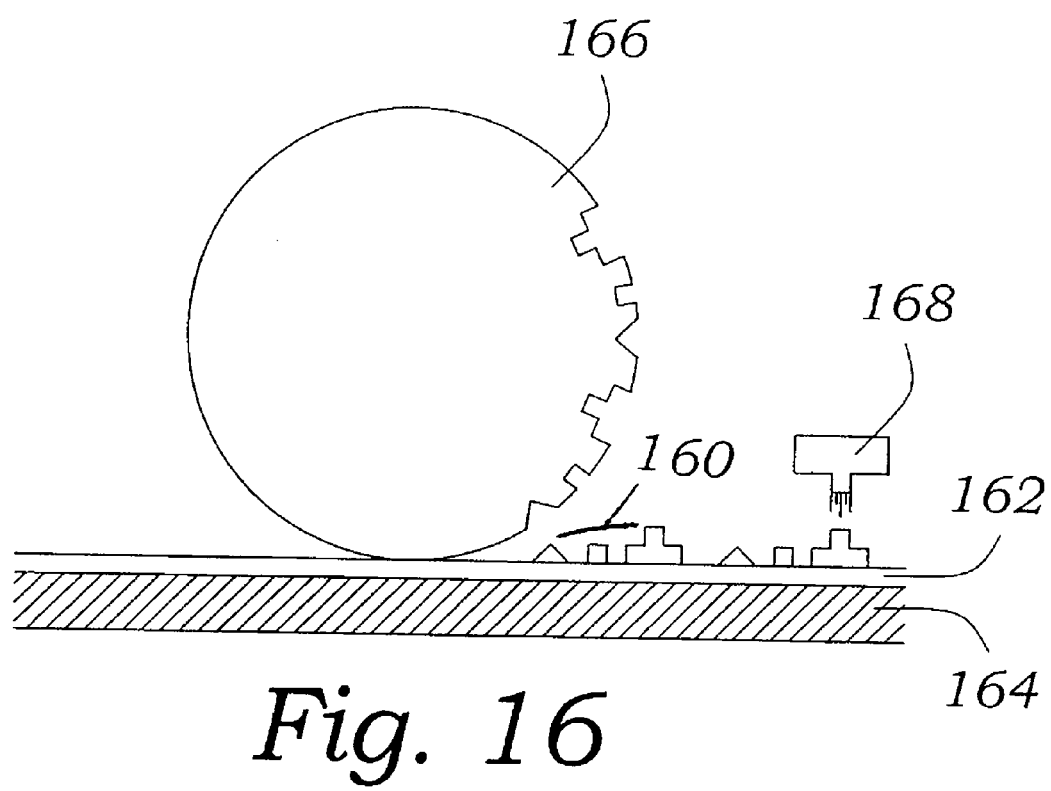
FIG. 16 illustrates an exemplary method for producing a two dimensional color image on a surface in accordance with another embodiment of the present invention.

As illustrated in FIG. 16, another alternative embodiment of the present invention utilizes color dot triads 160 which consist of red, green, and blue stepped structures. A uniform layer of black pigmented liquid photopolymer 162 is applied to a substrate 164 preferably by using a gravure coater. The substrate 164 with the liquid photopolymer 162 thereon is wrapped around an embossing roller 166 such that the liquid photopolymer 162 is in contact with the embossing roller 166. The embossing roller 166 carries a master that has the color dot triads 160 formed throughout it. An optical printhead 168 under computer control selectively cures the photopolymer to produce desired colors at desired locations via additive image presentation, e.g., red and green dots are exposed to produce yellow. Once all of the desired color dots have been cured, the substrate with the areas of cured photopolymer bonded thereto is peeled away from the embossing roller and the uncured areas lose their stepped structure. The entire surface of the embossment is then subjected to a flood exposure of curing radiation which produces black zones in areas where the stepped structures have been lost. These black zones represent areas which are intended to be black in the image.

Figure 17:
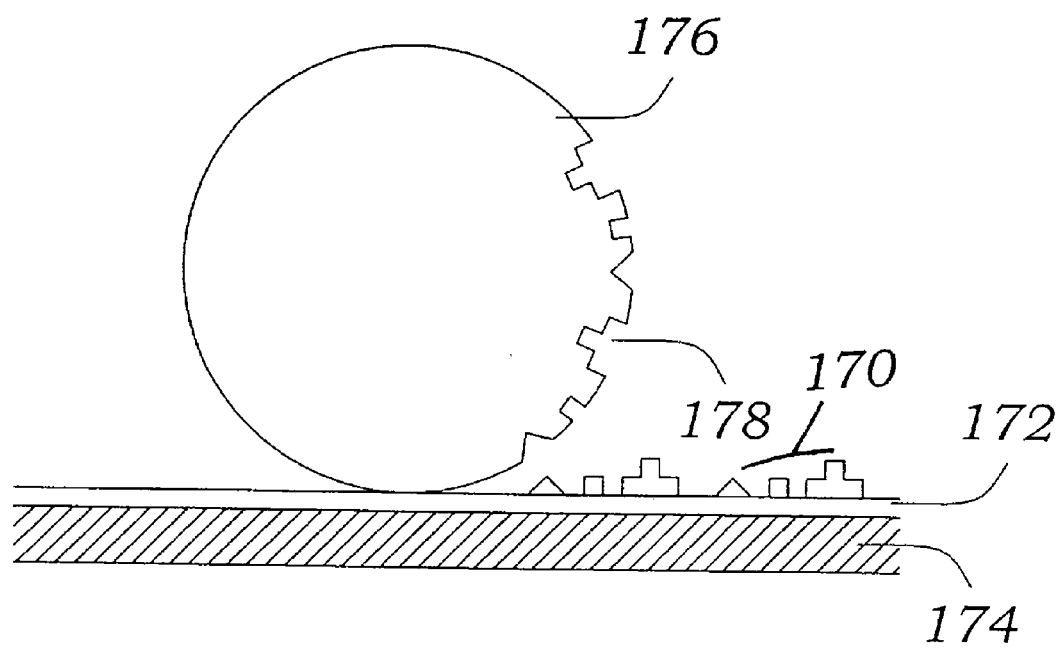
FIG. 17 illustrates another method for producing a two dimensional color image on a surface in accordance with another embodiment of the present invention.

Another alternate embodiment of the present invention, illustrated in FIG. 17, produces color triads 170 by using a black thermoplastic coating 172 on a substrate 174 and an embossing roller 176 which carries a color dot triad master 178. The thermoplastic coating 172 is placed in contact with the color dot triad master 178 as the substrate and the thermoplastic are wrapped around the embossing roller 176. The thermoplastic coating 172 is selectively melted as it comes into contact with the embossing roller 176 thereby producing the desired colors at the desired locations. The selective heating can be accomplished by several alternative means such as by laser heating the thermoplastic 172 at select locations or by thermoelectric heating of the desired stepped structures on the embossing roller 176. Alternatively, a heated printhead that has the stepped structures thereon and which strikes the thermoplastic at desired locations can be used to produce the desired stepped structures at the desired location.

Figure 18:
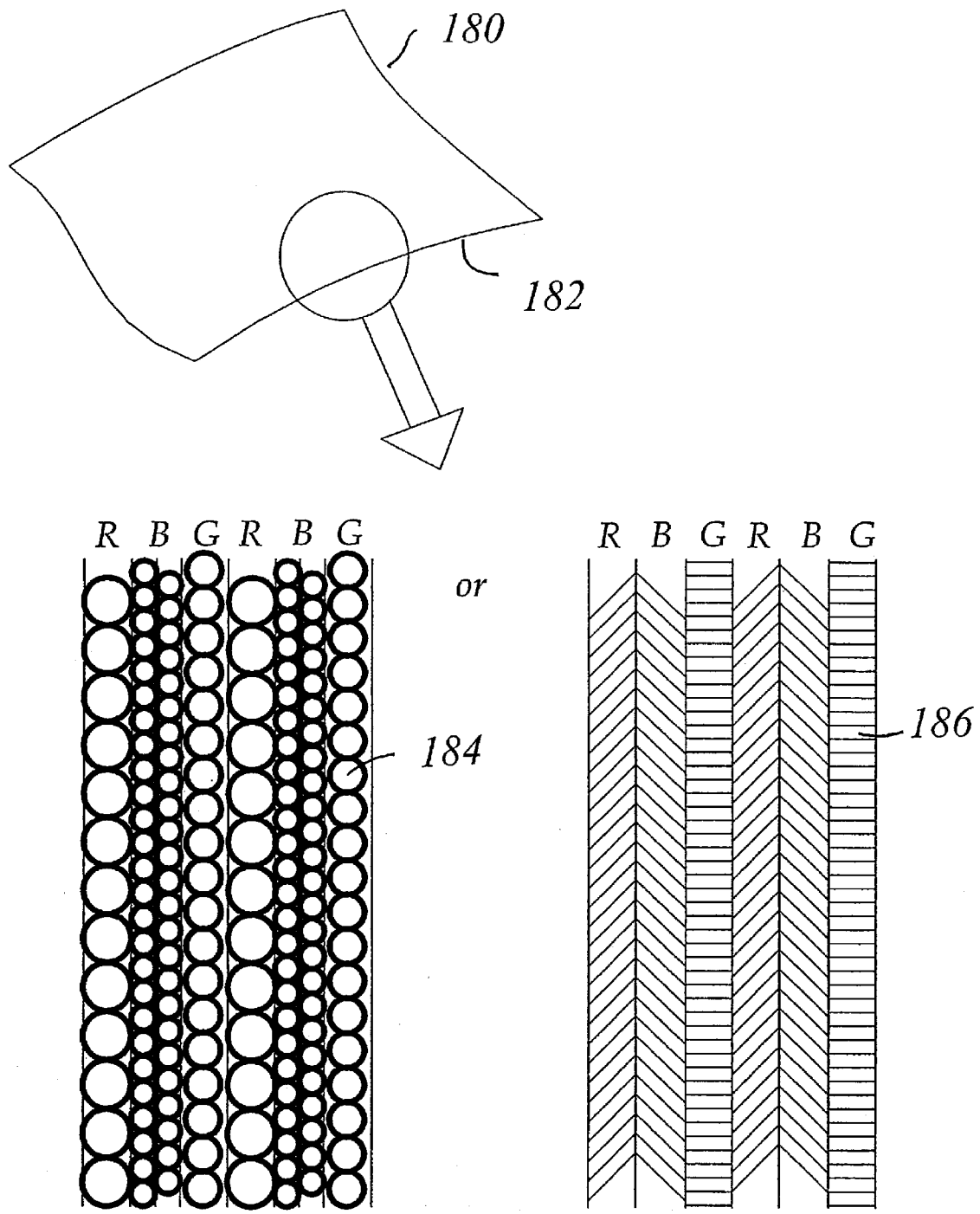
FIG. 18 illustrates a substrate for one-pass printing in accordance with another embodiment of the present invention.

As illustrated in FIG. 18, another alternative embodiment of the present invention provides for a one-pass printing substrate 180 that is produced by thermally embossing a thermoplastic material 182 to create color dot triads 184 thereon. Preferably, the color dot triads 184 are arranged in vertically linear registers (columns) 186, as illustrated in the magnified views. The widths of the registers can be in proportion to their photoptic visibility. Preferably, the thermoplastic material 182 is pigmented black and the color dot triads 184 are provided in appropriate numbers to make the substrate 180 appear to reflect white light via additive color combination. The color dot triads 184 may optionally be overcoated with a thin metal layer, such as evaporated aluminum, to enhance their reflectivity.

In use, specific stepped structures at specific locations on the substrate may be modified in accordance with optical registration marks incorporated into the substrate to produce the desired colors at desired locations. The local modification of the stepped color structures can be applied either to a whole stepped structure or to a smaller part thereof by a variety of means, including laser ablation, laser melting, sub-melting-point thermal deformation by laser heating, mechanical pressure in combination (or not) with heating, solvent melting, ultrasonic heating and/or melting, application of a refractive overcoating, and application of an opaque coating (perferably black ink or toner). For example, the color dots can be clustered so that an array of 6×6 color triads constitutes one image dot. Each stepped color structure dot constitutes one pixel, there being 36 pixels of each color in the dot, yielding a color resolution of $36^3$, or 46,656 colors per dot. Assuming each color dot in a triad is approximately 4μ in diameter, the dot resolution can be greater than 500 dots per inch. Therefore, many different shades of each color can be realized by selectively modifying specific stepped structures in a given pixel. Higher imaging resolutions can be obtained by modifying the reflectivity of a stepped structure without completely turning it off. This can be accomplished by modification of a only part of a color structure, such as thermal ablation, melting, or opaquely covering one quadrant of a color structure, thereby diminishing the intensity of light reflected by that structure to three quarters of its unmodified intensity. Assuming a 6μ diameter color dot, having an area of about 28.3 sq.μ, and having a diffraction limited semiconductor laser capable of modifying an area of the color dot equal to its focal spot diameter of about 0.5 microns (about 0.2 sq.μ), the number of intensity levels per color dot is about 141, providing a total color resolution of $141^3 = 2,803,221$ colors. A color dot triad assembled from a red, green and blue dot of this size would measure about 10μ in diameter, resulting in a spatial image resolution of 2,540 dots per inch. Smaller color dots could be used to obtain higher spatial image resolutions with an attendant sacrifice of color resolution.

Figure 19A:
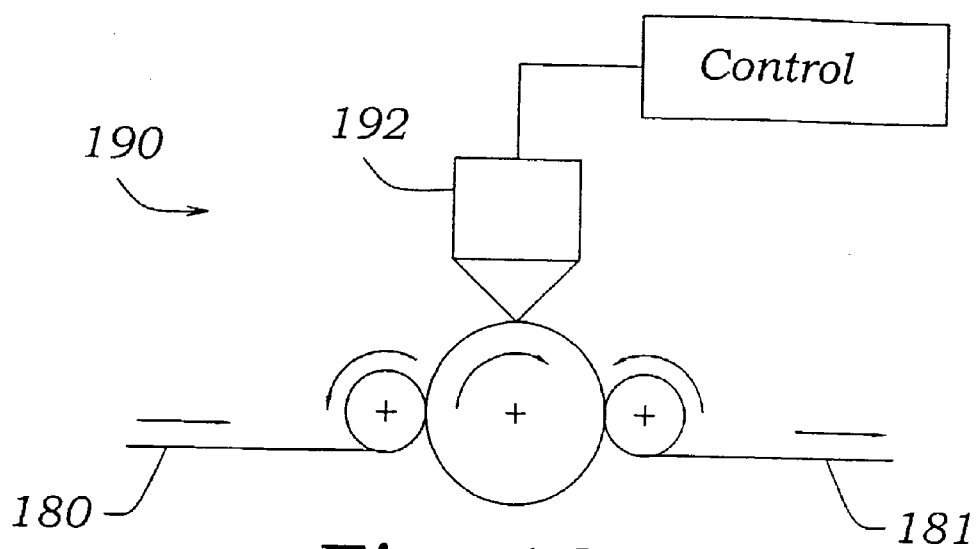
FIGS. 19a-19c illustrate a one-pass printing method for use with the substrate of FIG. 18.
Figure 19B:
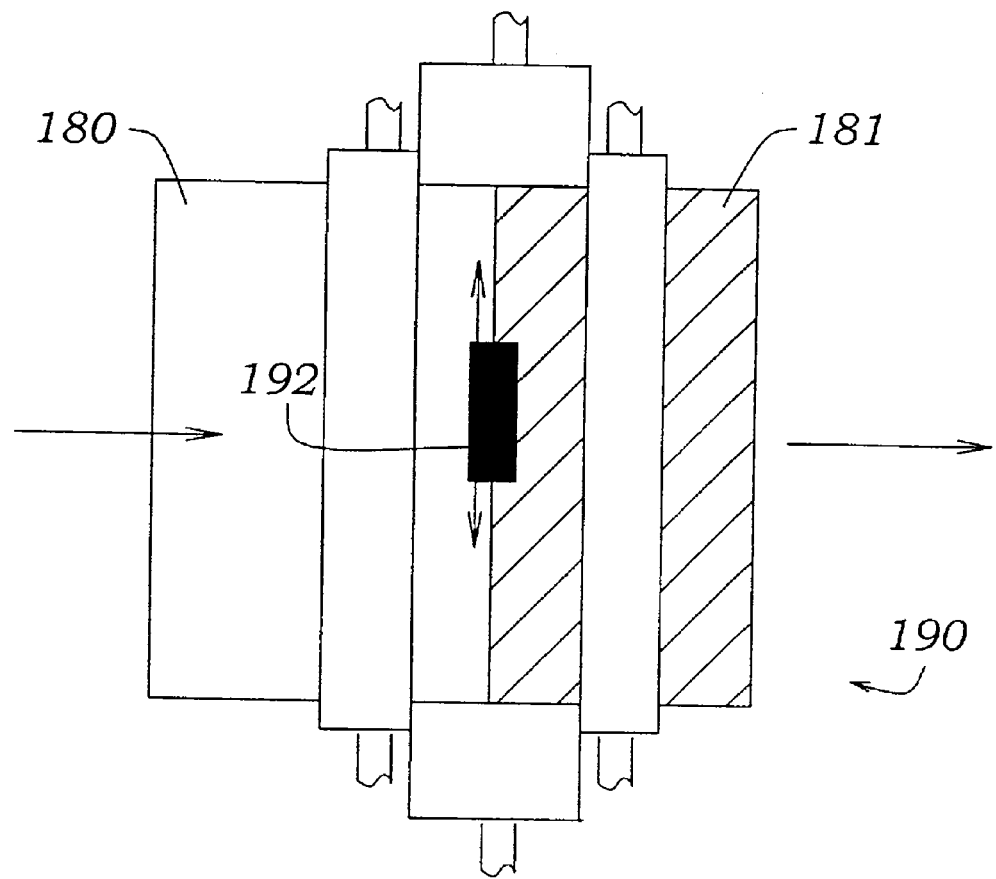
Figure 19C:
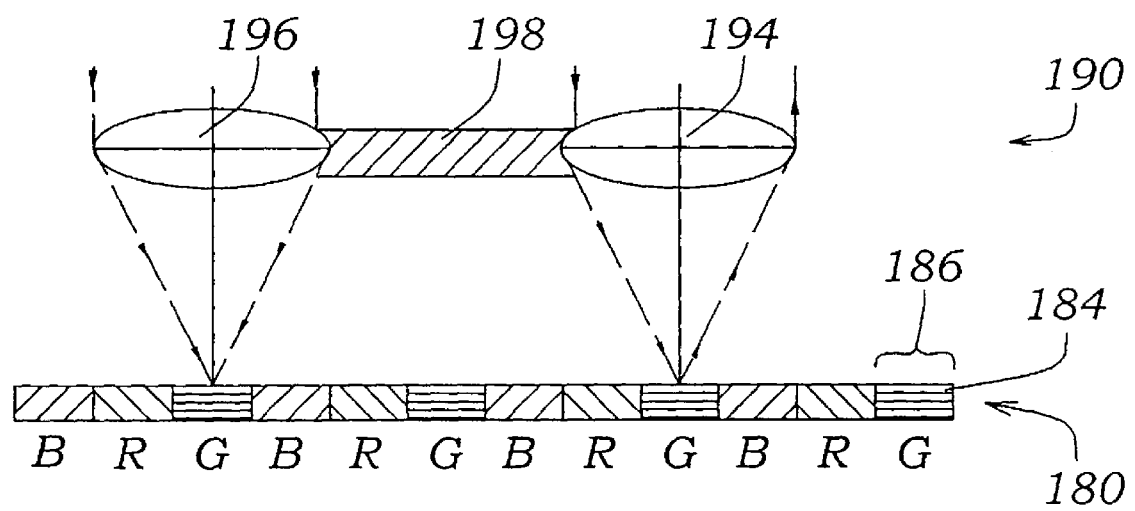

As illustrated in FIGS. 19a-19c, a printer 190 can be used for toner-free one-pass printing in conjunction with one-pass printing substrate 180. FIG. 19a illustrates a schematic side view of the printing system. FIG. 19b illustrates a top view of the system. Printer 190 preferably includes means for feeding in a page of blank substrate material 180 (such as shown in FIG. 18) and means for selectively modifying the periodic color microstructures disposed thereon. The printer 190 is controlled by a computer. The means for selectively modifying the periodic microstructures may be an optically scanned laser beam, a moving write head bearing one or more solid state infrared lasers, a fiber optic write head delivering laser energy to the periodic structures, heated metal pins which are made to strike the material and flatten the periodic structures, an inkjet device for deposition of a refractive or opaque coating, a thermal printhead in contact with the substrate, ultrasonic heating applied through contacting elements, or other similar means.

This aspect of the invention is therefore a new method for printing additive color images wherein an image is formed in a manner analogous to how an image is formed by a computer on a CRT. In both cases the display device bears color dots, or pixels, which produce the additive color perception of a uniform white surface. In both cases a computer can be used to "turn down" the intensity of individual color pixels to selected values to create an image. The color is inherent in the display devices and images are obtained by modulating the intensity of those colors. This is very different from conventional printing, wherein successive colors of ink or pigment are applied to a uniformly white surface to obtain a subtractive color image.

As has been stated, one embodiment of the invention utilizes an ink deposition system, preferably a black ink inkjet printhead, to deposit dots of ink on the microstructured substrate to print the image. This method is unique because the ink dots are used to modulate the intensity of the color microstructures and to "reveal" the image from the originally white appearing substrate. Although a single color of ink may be used, such as black, a full additive color image results.

In effect, the ink is used to cover up the color inverted image dots which mask the viewer's perception of the desired color image dots. The additive sum of the color inverted image and the desired color image makes white. To reveal the desired image (by any of these methods) it is simply necessary to modify, obliterate, obscure, or cover up the microstructure image dots representing the inverse color image.

In a preferred embodiment, a printhead 192 includes registration optics 94 and modification optics 196 spaced apart from one another at a fixed distance via rigid connection 198. The substrate 180 includes a plurality of evenly spaced vertical registers or columns 186 of color structures 184 corresponding to each selected color. The printhead 192 scans horizontally across the page, moving substantially perpendicular to the vertically disposed structural color registers 186. As the printhead 192 moves horizontally across the substrate page 180, the registration optics 194 detect the position of the printhead 192 relative to the color registers 186. The registration optics 194 then output a control signal to the computer controlling the modification optics 196 (which is rigidly connected 198 to the registration optics 194 to maintain their physical relation) indicating the current printhead position. The computer then prompts the modification optics 196 to selectively modify the corresponding color registers 186 as necessary to produce the desired final color pattern on the substrate page 180 to produce the imaged optical substrate 181. Bi-directional printing may be facilitated by adding a second registration control optical sensor on the opposite side of the modification optics 196.

Yet another alternative embodiment of the present invention, utilizes a substrate that is coated with a uniform layer of black pigmented liquid photopolymer and a printhead bearing a plurality of UV light-conducting pins. Each pin bears a selected color reflecting periodic structure embossed thereon. The pins do not become UV conducting until they strike the liquid photopolymer, thereby curing it at selected locations and forming the desired periodic structure therein. A post-printing UV exposure step is required to cure the areas which bear no periodic structures and to remove the uncured photopolymer therefrom. If the periodic structures are formed in a black pigmented thermoplastic, the periodic structures can be covered with a thin layer of metal. The metal can then be overcoated with a layer of transparent material which has a lower melting point than the metal. This transparent layer protects the material from being contaminated. In order to obliterate specific structures, a laser beam can be used which melts the overcoat first and the stepped structure second thereby producing a non-color generating surface in place of the stepped structure. The step height of these periodic structures is chosen to reflect then desired color while embedded in the transparent overcoat thereon.

In summary, the invention relates to several alternative methods for fabricating a light control material, or device, which carries color information in the form of periodic structures wherein each periodic structure reflects one or more bandwidths of light in accordance with the design of that particular periodic structure. The fabricated device can either be a final image or a master from which embossment tooling can be generated and used for embossing microstructured images which bear the color information carried on the master. Although several desirable methods for creating the device of the present invention have been disclosed, the present invention is not limited to any particular methods. For example, there are several ways to obtain the device of the present invention through masking and etching which are similar to the method discussed above with respect to FIGS. 9a-9e. Other mechanical techniques such as diamond turning, for example, may be used to create the device or material of the present invention. It should be apparent to those skilled in the art that there are many ways to create the device or material of the present invention which are within the spirit and scope of the present invention.

What is claimed is:

1. A light control material, said material comprising: a material body including a plurality of microstructures, the microstructures designed to produce an additive color perception of one or more colors and designed to reveal an image when light reflected from one or more of the microstructures is modulated, wherein the light reflected from the one or more of the microstructures is modulated by one or more of melting, heating, optically ablating, thermally deforming, or mechanically deforming the one or more microstructures.

2. The light control material of claim 1, wherein each of said microstructures comprise a plurality of concentric steps, each step having a step height equal to about one half of a wavelength of light-forming the image.

3. The light control material of claim 2, wherein the microstructures comprise substantially equal step heights, and wherein each stepped structure reflects a wavelength of phase coherent wavelength-of light-equal to twice the step height of the steps.

4. The light control material of claim 3, wherein each of said microstructures has a substantially parabolic vertical cross-sectional profile.

5. The light control material of claim 3, wherein each of said concentric steps has approximately the same surface area.

6. The light control material of claim 3, wherein a plurality of said steps are curved to widen the effective viewing area at which said reflected light can be observed.

7. The light control material of claim 2, wherein each stepped structure reflects a selected central color having a wavelength correlated to twice the average height of said steps and having a bandwidth correlated to the number of said steps.

8. The light control material of claim 2, wherein a first one of said microstructures is comprised of steps having one step height and a second one of said microstructures is comprised of steps having a differing step height than those of the first one of said microstructures.

9. The light control material of claim 2, wherein at least two microstructures have steps of differing heights.

10. The light control material of claim 1, wherein said microstructures are produced by a method including the step of applying an interference pattern onto a photosensitive material.

11. A light control material of claim 1, wherein said microstructures are embossed into the material body in a single embossment.

12. The light control material of claim 1, wherein at least two of said microstructures reflect substantially different wavelengths of visible spectrum light.

13. The light control material of claim 12, wherein said revealed microstructures produce an additive image of a secondary color by constructive interference.

14. The light control material of claim 1 wherein said material body includes a glass substrate and said microstructures include a cured photopolymer.

15. The light control material of claim 1, wherein said material body and said microstructures are composed of quartz.

16. The light control material of claim 1, wherein said microstructures include a thermoplastic material.

17. The light control material of claim 1, wherein said material body and said microstructures are overcoated with a thin layer of metal and wherein said layer of metal is overcoated with a layer of transparent material.

18. The light control material of claim 1, further comprising an overlay material disposed adjacent over said material body having said microstuctures, said overlay material having a particular refractive index, wherein the periodicity of said microstructures is selected to correspond to a desired wavelength of light in a medium having the refractive index of the overlay material.

19. The light control material of claim 1, including a plurality of linear arrays of said microstructures, wherein each linear array of microstructures has a periodicity corresponding to a particular wavelength of light.

20. The light control material of claim 1, wherein said microstructures are embedded in a surface of said material body.

21. The light control material of claim 1, wherein said microstructures comprise a plurality of ribbed structures spaced apart at a distance of about ½ of the wavelength of light derived to be reflected from the material.

22. The light control material of claim 1, wherein said microstructures comprise a plurality of lattice inclusions having a refractive index on the order of 1, and wherein said material body is comprised of a material having refractive index in the range of about 1.4 to about 1.65 or vice versa.

23. The light control material of claim 1, wherein the microstructures, prior to modulation of light reflected from the one or more microstructures, produce a uniform white additive color perception.

24. The light control material of claim 23, wherein the modulation results in revealing a color other than white.

25. The light control material of claim 23, wherein multiple linear registers of microstructures are disposed in the colors red, green and blue in a proportion selected to additively create the uniform white additive color perception.

26. The light control material of claim 1, wherein the plurality of microstructures include microstructures representing an inverse color image and the modulation of the selected one or more microstructures involves modulation of microstructures representing an inverse color image.

27. The light control material of claim 1, wherein light reflected from the one or more microstructures is modulated by deformation of the one or more microstructures by one or more of laser ablation, laser melting, or sub-melting point thermal deformation by laser heating.

28. The light control material of claim 1, wherein light reflected from the one or more microstructures is modulated by deformation of the one or more microstructures by thermal ablation.

29. The light control material of claim 1, wherein light reflected from the one or more microstructures is modulated by deformation of the one or more microstructures by solvent melting.

30. A method for creating a light control material comprising the steps of: providing a material body; producing a plurality of microstructures therein or thereon having a periodicity to reflect a particular bandwidth of light to form an image and designed to produce an additive color perception of one or more colors, the plurality of microstructures designed to reveal the image when the intensity of light reflected from one or more of the microstructures is modulated by deforming one or more of the microstructures by one or more of melting, heating, optically ablating, thermally deforming, or mechanically deforming the one or more microstructures.

31. The method of claim 30, wherein each microstructure is comprised of a plurality of steps, each step having a step height equal to substantially one half of a wavelength of visible spectrum light and wherein all of the steps comprising any one of said stepped structures have substantially equal step heights, wherein each stepped structure reflects one wavelength of phase coherent visible spectrum light, wherein the wavelength of phase coherent visible spectrum light reflected by any one of said stepped structures is equal to substantially twice the step height of the steps of the stepped structure, whereby said material displays a multicolor image.

32. A method for displaying a color image according to claim 30, wherein at least one of said stepped structures reflects a wavelength of phase coherent visible spectrum light that is different from the wavelength of phase coherent visible spectrum light reflected by another one of said stepped structures.

33. The method of claim 32, wherein the substrate is substantially planar.

34. The method of claim 32, wherein the substrate provides a surface which is substantially round in cross-section.

35. The method of claim 32, wherein said plurality of microstructures includes differing microstructures that preferentially reflect differing wavelengths of light.

36. The method of claim 35, wherein said plurality of microstructures initially act together via additive color addition to provide an apparent reflection of white light.

37. The method of claim 35, wherein said differing microstructures are arranged in linear arrays of like microstructures.

38. The method of claim 32, wherein the light reflected from the one or more microstructures is physically altered by one or more of physically modifying, obliterating, obscuring or covering up the one or more microstructures.

39. A light control material, said material comprising: a material body including a plurality of microstructures, the microstructures designed to produce an additive color perception of one or more colors and designed to reveal an image when light reflected from one or more of the microstructures is modulated, wherein light reflected from the one or more microstructures is modulated by deformation of the one or more microstructures by mechanical pressure.

40. A light control material, said material comprising: a material body including a plurality of microstructures, the microstructures designed to produce an additive color perception of one or more colors and designed to reveal an image when light reflected from one or more of the microstructures is modulated, wherein light reflected from the one or more microstructures is modulated by deformation of the one or more microstructures by mechanical pressure in combination with heating or melting.

41. A light control material, said material comprising: a material body including a plurality of microstructures, the microstructures designed to produce an additive color perception of one or more colors and designed to reveal an image when light reflected from one or more of the microstructures is modulated, wherein light reflected from the one or more microstructures is modulated by deformation of the one or more microstructures by ultrasonic heating or melting.

* * * * *